(12) United States Patent
Kikui

(10) Patent No.: US 9,283,978 B2
(45) Date of Patent: Mar. 15, 2016

(54) STROLLER

(71) Applicant: COMBI CORPORATION, Tokyo-to (JP)

(72) Inventor: Toshihiro Kikui, Tokyo-to (JP)

(73) Assignee: Combi Corporation, Tokyo-To (JP)

( * ) Notice: Subject to any disclaimer, the term of this patent is extended or adjusted under 35 U.S.C. 154(b) by 0 days.

(21) Appl. No.: 13/938,721

(22) Filed: Jul. 10, 2013

(65) Prior Publication Data

US 2014/0021697 A1    Jan. 23, 2014

(30) Foreign Application Priority Data

Jul. 10, 2012  (JP) .................................. 2012-154831
Nov. 28, 2012  (JP) .................................. 2012-259873

(51) Int. Cl.
| B62B 7/08 | (2006.01) |
| B62B 7/00 | (2006.01) |
| B62B 7/04 | (2006.01) |
| B62B 9/08 | (2006.01) |
| B62B 9/20 | (2006.01) |
| B62B 3/00 | (2006.01) |

(52) U.S. Cl.
CPC ................. *B62B 7/008* (2013.01); *B62B 7/042* (2013.01); *B62B 7/08* (2013.01); *B62B 9/082* (2013.01); *B62B 9/087* (2013.01); *B62B 9/20* (2013.01); *B62B 3/008* (2013.01); *B62B 2301/04* (2013.01)

(58) Field of Classification Search
CPC ........... B62B 7/008; B62B 7/08; B62B 7/10; B62B 3/008
USPC .............. 280/47.38, 658, 657, 650, 642, 647, 280/47.4, 47.41
See application file for complete search history.

(56) References Cited

U.S. PATENT DOCUMENTS

| 4,858,947 | A  * | 8/1989  | Yee et al. ........................ 280/643 |
| 5,158,319 | A  * | 10/1992 | Norcia et al. .................. 280/643 |
| 5,653,460 | A  * | 8/1997  | Fogarty ........................... 280/642 |
| 5,722,682 | A  * | 3/1998  | Wang ............................. 280/642 |
| 5,887,935 | A  * | 3/1999  | Sack .............................. 296/122 |
| 6,086,087 | A  * | 7/2000  | Yang ............................. 280/658 |
| 6,267,406 | B1 * | 7/2001  | Huang ........................... 280/647 |
| 6,341,672 | B1 * | 1/2002  | Yang et al. ..................... 188/20 |
| 6,454,286 | B1 * | 9/2002  | Hosino ........................ 280/250.1 |
| 7,757,819 | B2 * | 7/2010  | Chen ............................. 188/20 |
| 8,205,723 | B2 * | 6/2012  | Liao ............................. 188/19 |
| 8,328,208 | B2 * | 12/2012 | Chen ........................... 280/47.38 |
| 8,480,115 | B2 * | 7/2013  | Chen et al. .................... 280/643 |
| 8,602,441 | B2 * | 12/2013 | Li ................................. 280/642 |
| 2002/0033588 | A1 | 3/2002 | Kaneko et al. |
| 2010/0072731 | A1 * | 3/2010 | Thompson .................... 280/642 |
| 2013/0106078 | A1 * | 5/2013 | Li ................................. 280/650 |
| 2013/0154215 | A1 * | 6/2013 | Thomas et al. ............. 280/47.38 |
| 2014/0191483 | A1 * | 7/2014 | Rolicki et al. ............. 280/47.41 |

* cited by examiner

*Primary Examiner* — Brodie Follman
*Assistant Examiner* — Emma K Frick
(74) *Attorney, Agent, or Firm* — John B. Hardaway, III; Nexsen Pruet, LLC

(57) ABSTRACT

A stroller (10) includes: a front leg (31); a middle leg (34) located rearward of the front leg; a rear leg (37) located rearward of the middle leg; a front-wheel holding mechanism (21) provided on the front leg; a middle-wheel holding mechanism (24) provided on the middle leg; and a rear-wheel holding mechanism (27) provided on the rear leg. The front-wheel holding mechanism is configured to rotatably and turnably hold a front wheel (22). The middle-wheel holding mechanism is configured to rotatably and unturnably hold a middle wheel (25). The rear-wheel holding mechanism is configured to rotatably and turnably hold a rear wheel (28).

14 Claims, 18 Drawing Sheets

STROLLER

CROSS REFERENCE TO RELATED APPLICATIONS

This application is based upon and claims the benefit of priority from the prior Japanese Patent Application No. 2012-154831 filed on Jul. 10, 2012 and the prior Japanese Patent Application No. 2012-259873 filed on Nov. 28, 2012, the entire contents of which are incorporated herein by reference.

BACKGROUND OF THE INVENTION

1. Field of the Invention

The present invention relates to a stroller capable of letting babies ride thereon in such a manner that the babies are seated in a back and front direction.

2. Background Art

As disclosed in US2002-033588, strollers capable of transporting a plurality of babies are used. As such strollers, there are known strollers of the type in which babies are seated in the lateral direction, and a stroller of a type in which babies are seated in the back and front positions. In the stroller of either type, a caregiver of the babies steers the stroller from a rear side thereof, while grasping a handle disposed on a rear part of the stroller. Generally, when the stroller travels along a curved path, the stroller is turned about an axis of a rear wheel position in the back and front direction, so as to change a traveling direction (facing direction) of the stroller.

However, in the stroller of a type in which babies are seated in the back and front positions, i.e., in the tandem-type stroller, an overall length from the back to the front is longer. Thus, in the stroller of a type in which babies are seated in tandem, the center of gravity of the stroller transporting the babies is positioned largely forward of a turning center of the stroller about which the stroller is turned to change its traveling direction. On the other hand, the handle to which a force is applied by the steering person is positioned near to the turning center of the stroller about which the stroller is turned so as to change its traveling direction, in the back and front direction. Thus, when the stroller is turned, it is necessary for the steering person to apply a very large force to the handle, which makes the steering difficult.

BRIEF SUMMARY OF THE INVENTION

The present invention has been made in view of the above circumstances. The object of the present invention is to improve the steerability of a stroller in which a plurality of babies can be seated in the back and front positions.

A first stroller according to the present invention is a stroller including:

a front leg;

a middle leg located rearward of the front leg;

a rear leg located rearward of the middle leg;

a front-wheel holding mechanism provided on the front leg, the front-wheel holding mechanism being configured to rotatably and turnably hold a front wheel;

a middle-wheel holding mechanism provided on the middle leg, the middle-wheel holding mechanism being configured to rotatably and unturnably hold a middle wheel; and a rear-wheel holding mechanism provided on the rear leg, the rear-wheel holding mechanism being configured to rotatably and turnably hold a rear wheel, wherein the stroller is capable of letting babies ride thereon in such a manner that the babies are seated in a back to front position.

The first stroller according to the present invention may further include:

a handle;

a fourth link element pivotably joined, at a rear portion thereof, to the handle, and pivotably joined to an upper portion of the rear leg;

a first link element pivotably joined, at a rear portion thereof, to the handle, and pivotably joined, at a front portion thereof, to the front leg;

a second link element pivotably joined to a front portion of the fourth link element, and pivotably joined to an intermediate portion of the first link element;

a third link element pivotably joined, at a rear portion thereof, to the second link element, and pivotably joined to an upper portion of the front leg and an upper portion of the middle leg;

a fifth link element pivotably joined to the second link element and the middle leg, respectively; and a sixth link element pivotably joined to the handle and the rear leg, respectively.

In the first stroller according to the present invention, a pair of the front legs may be provided to be spaced apart from each other in a width direction; a pair of the middle legs may be provided to be spaced apart from each other in the width direction; a pair of the rear legs may be provided to be spaced apart from each other in the width direction; the front-wheel holding mechanism may be provided on each front leg; the middle-wheel holding mechanism may be provided on each middle leg; and the rear-wheel holding mechanism may be provided on each rear leg. Alternatively, in the first stroller according to the present invention, the front leg may include a pair of front-leg extending parts located to be spaced apart from each other in a width direction, and a front-leg connection part connecting the pair of front-leg extending parts; a pair of the middle legs may be provided to be spaced apart from each other in the width direction; a pair of the rear legs may be provided to be spaced apart from each other in the width direction; the front-wheel holding mechanism may be provided on the front connection part; the middle-wheel holding mechanism may be provided on each middle leg; and the rear-wheel holding mechanism may be provided on each rear leg. Alternatively, in the first stroller according to the present invention, a pair of the front legs may be provided to be spaced apart from each other in a width direction; a pair of the middle legs may be provided to be spaced apart from each other in the width direction; the rear leg may include a pair of rear-leg extending parts located to be spaced apart from each other in the width direction, and a rear-leg connection part connecting the pair of rear-leg extending parts; the front-wheel holding mechanism may be provided on each front leg; the middle-wheel holding mechanism may be provided on each middle leg; and the rear-wheel holding mechanism may be provided on the rear-leg connection part. Alternatively, in the first stroller according to the present invention, the front leg may include a pair of front-leg extending parts located to be spaced apart from each other in a width direction, and a front-leg connection part connecting the pair of front-leg extending parts; a pair of the middle legs may be provided to be spaced apart from each other in the width direction; the rear leg may include a pair of rear-leg extending parts located to be spaced apart from each other in the width direction, and a rear-leg connection part connecting the pair of rear-leg extending parts; the front-wheel holding mechanism may be provided on the front-leg connection part; the middle-wheel holding mechanism may be provided on each middle leg; and the rear-wheel holding mechanism may be provided on the rear-leg connection part.

A second stroller according to the present invention is a stroller including:

a front leg;

a rear leg located rearward of the front leg;

a middle leg located rearward of the middle leg;

a first link element pivotably joined, at a front portion thereof, to the front leg;

a handle pivotably joined to a rear portion of the first link element;

a fourth link element pivotably joined, at a rear portion thereof, to the handle, and pivotably joined to an upper portion of the rear leg;

a second link element pivotably joined to a front portion of the fourth link element, and pivotably joined to an intermediate portion of the first link element;

a third link element pivotably joined, at a rear portion thereof, to the second link element, and pivotably joined to an upper portion of the front leg and an upper portion of the middle leg;

a fifth link element pivotably joined to the second link element and the middle leg, respectively; and a sixth link element pivotably joined to the handle and the rear leg, respectively.

In the second stroller according to the present invention, a pair of the front legs may be provided to be spaced apart from each other in a width direction; a pair of the middle legs may be provided to be spaced apart from each other in the width direction; and a pair of the rear legs may be provided to be spaced apart from each other in the width direction. Alternatively, in the second stroller according to the present invention, the front leg may include a pair of front-leg extending parts located to be spaced apart from each other in a width direction, and a front-leg connection part connecting the pair of front-leg extending parts; a pair of the middle legs may be provided to be spaced apart from each other in the width direction; and a pair of the rear legs may be provided to be spaced apart from each other in the width direction. Alternatively, in the second stroller according to the present invention, a pair of the front legs may be provided to be spaced apart from each other in the width direction, a pair of the middle legs may be provided to be spaced apart from each other in the width direction, and the rear leg may include a pair of rear-leg extending parts located to be spaced apart from each other in the width direction, and a rear-leg connection part connecting the pair of rear-leg extending parts. Alternatively, in the second stroller according to the present invention, the front leg may include a pair of front-leg extending parts located to be spaced apart from each other in the width direction, and a front-leg connection part connecting the pair of front-leg extending parts, a pair of the middle legs may be provided to be spaced apart from each other in the width direction, and the rear leg may include a pair of rear-leg extending parts located to be spaced apart from each other in the width direction, and a rear-leg connection part connecting the pair of rear-leg extending parts.

The first or second stroller according to the present invention may further include a first seat unit for letting a baby ride thereon and a second seat unit for letting a baby ride thereon, wherein the second seat unit is supported by a position, of the first link element, located rearward of the position at which the first link element is joined to the second link element, and the first seat unit is supported by the first link element on a position that is forward of the second seat unit.

The first or second stroller according to the present invention may further include a first seat unit for letting a baby ride thereon and a second seat unit for letting a baby ride thereon, wherein the first seat unit is supported by the third link element, and the second seat unit is supported by the fourth link element.

The first or second stroller according to the present invention may further include a first seat unit for letting a baby ride thereon and a second seat unit for letting a baby ride thereon, wherein at least a portion of the first seat unit is located between the front leg and the middle leg, in the back and front direction of the stroller, and the second seat unit is located rearward of the first seat unit, and at least a portion of the second seat unit is located between the middle leg and the rear leg, in the back and front direction of the stroller.

The first or second stroller according to the present invention may further comprise a stand member attached to a lower portion of the handle, wherein the stroller in a folded condition can stand by itself with only the stand member and the rear wheel being grounded. According to such a stroller, a space required for storing the stroller can be made smaller. In addition, handling of the folded stroller can be significantly improved.

In the first or second stroller according to the present invention, the stand member may be swingably attached to the handle and is urged to be separated from the rear wheel. According to such a stroller, a space required for storing the stroller can be made further smaller.

The first or second stroller according to the present invention may further include a braking mechanism capable of restricting rotation of the middle wheel. According to such a stroller, rotation of the wheel of the stroller can be stably restricted, while the braking mechanism can be made smaller and simplified.

In the first or second stroller according to the present invention, a pair of the middle legs may be provided to be spaced apart from each other in the width direction; the middle-wheel holding mechanism may be provided on each middle leg; and there may be provided a braking mechanism capable of restricting rotation of the pair of middle wheels held on the middle-wheel holding mechanisms. According to such a stroller, rotation of the wheel of the stroller can be stably restricted, while the braking mechanisms can be made smaller and simplified.

In the first or second stroller according to the present invention, the braking mechanism may include: a cam member that is located on a position between the pair of middle-wheel holding mechanisms or a position between the pair of middle legs; and shaft members that are respectively disposed between the cam member and the one middle wheel and between the cam member and the other middle wheel; the cam member may be movable between a first position and a second position; when the cam member is moved from the first position to the second position, each shaft member may be moved outward in the width direction to be engaged with the corresponding middle wheel so as to restrict the rotation of the middle wheel; and when the cam member is moved from the second position to the first position, each shaft member may be moved inward in the width direction to release the engagement between the shaft member and the corresponding middle wheel so as to enable the rotation of the middle wheel. According to such a stroller, by operating the one cam member, rotation of each of the pair of middle wheels can be restricted. Namely, the rotation of the wheel can be more reliably restricted by the simple operation.

In the first or second stroller according to the present invention, the braking mechanism may further include: an operation member that is movable between a release position and a restriction position, when the operation member is moved from the release position to the restriction position, the operation member being held as it is on the restriction position; and a release member configured to release the operation member held on the restriction position; when the operation member is moved from the release position to the restriction position, the cam member may be moved from the first position to the second position; and when the operation member is moved from the restriction position to the release position, the cam member may be moved from the second position to the first position. According to such a stroller, the cam member disposed on a position between the pair of middle-wheel holding mechanisms or a position between the pair of middle legs can be remotely operated, whereby the operability of the braking mechanism can be significantly improved.

According to the first or second stroller according to the present invention, the braking mechanism may further include an operation member configured to operate the movement of the cam member from the first position to the second position; and the operation member may be supported on a rear connection member that is located on a position between the pair of rear legs or a position between the pair of rear-wheel holding mechanisms. According to such a stroller, the cam member disposed on a position between the pair of middle-wheel holding mechanisms or a position between the pair of middle legs can be operated from the rear side of the stroller.

In the first or second stroller according to the present invention, the braking mechanism may further include socket members respectively disposed between the cam member and the one shaft member and between the cam member and the other shaft member; each socket member may have a recess opening outward in the width direction; and an inner end of the shaft member in the width direction may be located in the recess of the socket member, and the shaft member is relatively movable in the width direction with respect to the socket member. According to such a stroller, the cam member can be operated without adjusting the rotational position of the middle wheel.

In the first or second stroller according to the present invention, the braking mechanism may further include a first urging member configured to urge the shaft member outward in the width direction, and a second urging member configured to urge the shaft member inward in the width direction.

According to the present invention, it is possible to improve the steerability of a stroller in which a plurality of babies can be seated in a back to front position.

DETAILED DESCRIPTION OF THE INVENTION

An embodiment of the present invention will be described herebelow with reference to the drawings. FIGS. 1 to 6 are views for explaining an embodiment of a stroller according to the present invention.

Figure 1:
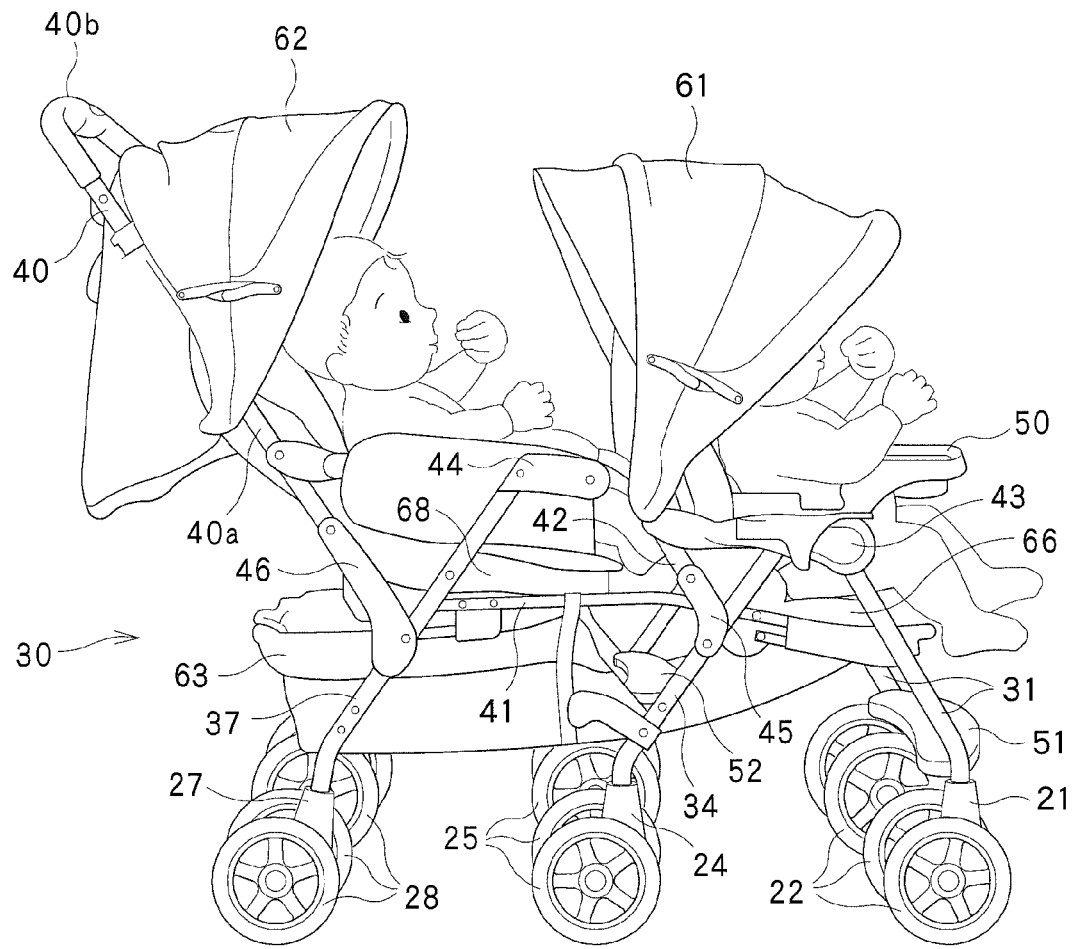
FIG. 1 is a perspective view of a first embodiment of the present invention, showing, from a lateral side, a stroller in the unfolded condition.
Figure 2:
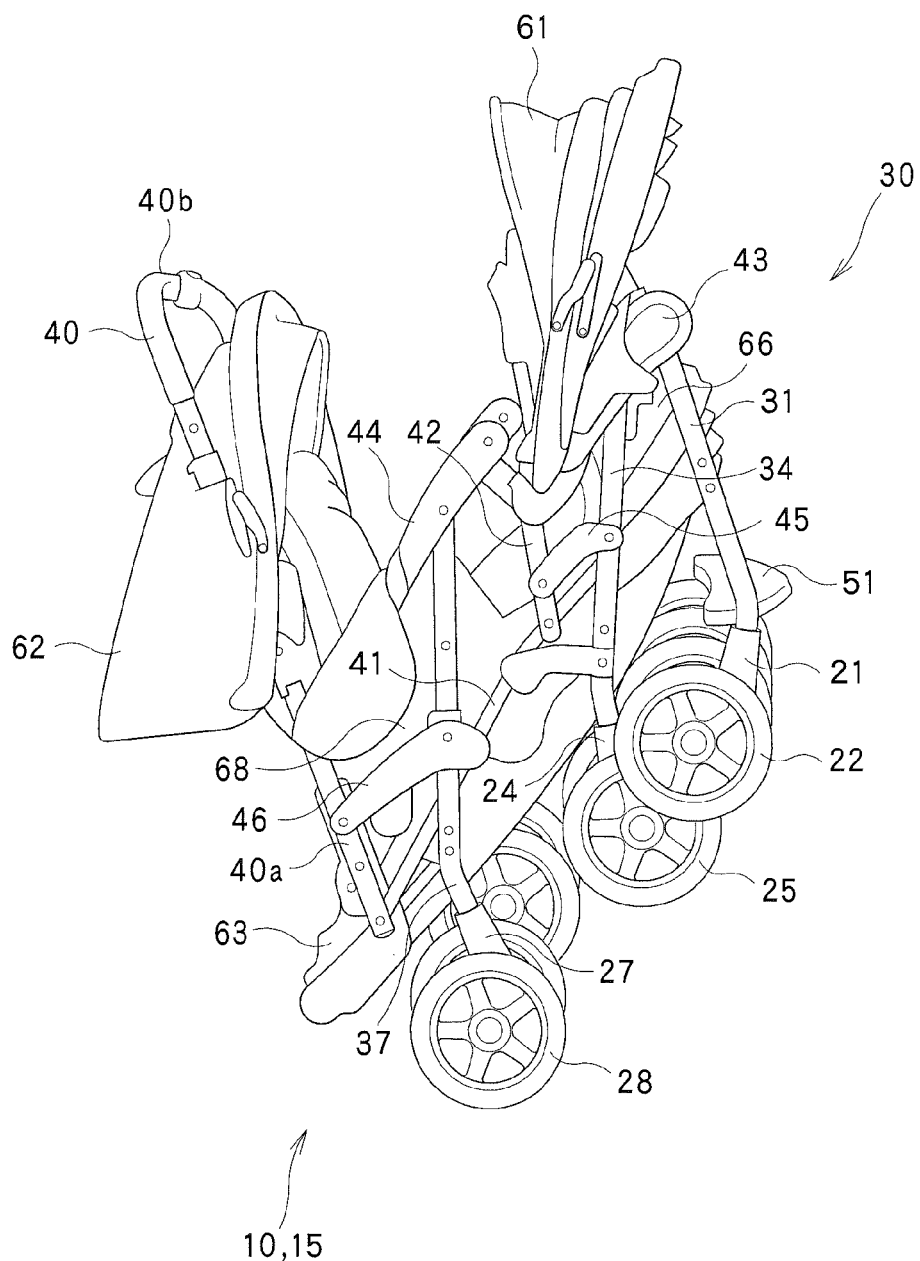
FIG. 2 is a perspective view showing, from the lateral side, the stroller in FIG. 1 in the course of being folded.
Figure 3:
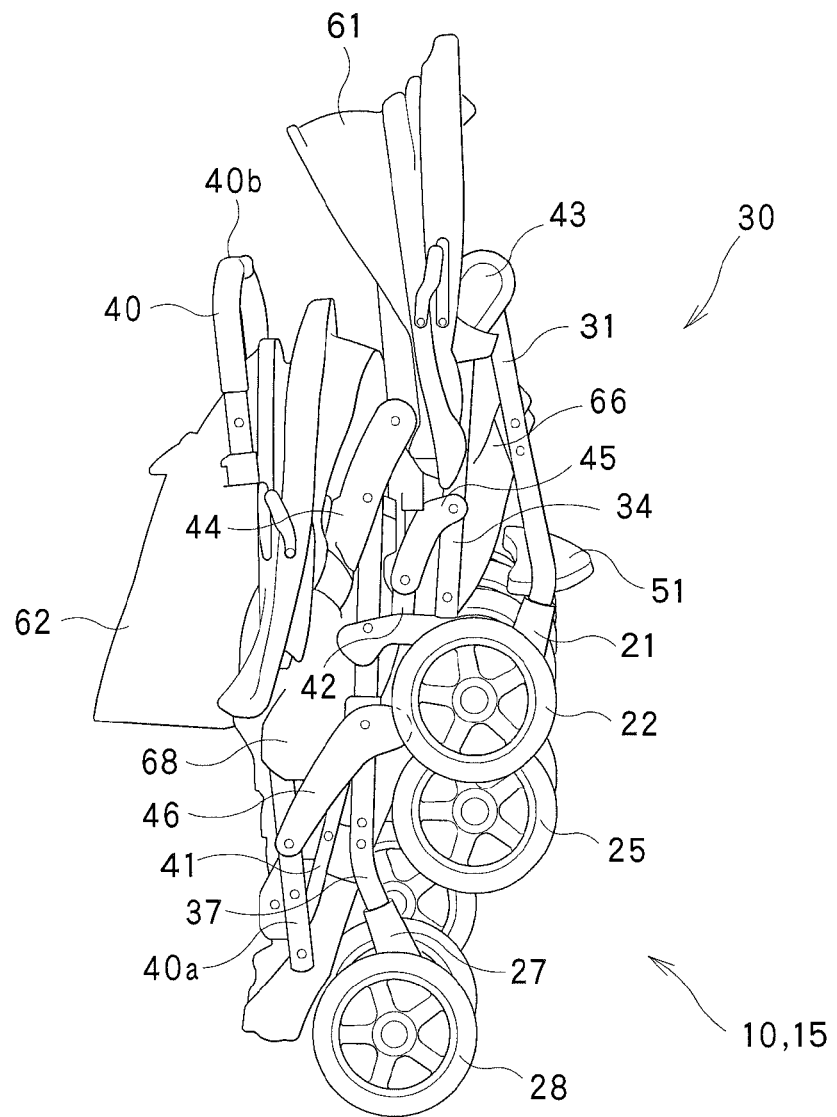
FIG. 3 is a view showing, from the lateral side, the stroller in FIG. 1 in the folded condition.

FIGS. 1 to 3 show a stroller 10 in one embodiment of the present invention. As shown in FIG. 1, the stroller 10 includes a stroller body 15, a first seat unit 66 supported by the stroller body 15, and a second seat unit 68 supported by the stroller body 15. The first seat unit 66 and the second seat unit 68 are places on which babies are seated, and are arranged to be aligned back to front. Namely, the illustrated stroller 10 is constituted as a two-seater stroller of a tandem type. As well shown in FIG. 4, the stroller body 15 includes a frame part 30 having legs 31, 34 and 37 and a handle 40, and wheel holding mechanisms 21, 24 and 27 provided on lower portions of the respective legs 31, 34 and 37.

In addition, as shown in FIGS. 2 and 3, the illustrated stroller 10 can be folded such that the legs 31, 34 and 37 and the handle 40 are brought close to each other. Many constituent elements of the stroller body 15 are pivotably coupled to each other, in order that the stroller can be folded.

Figure 4:
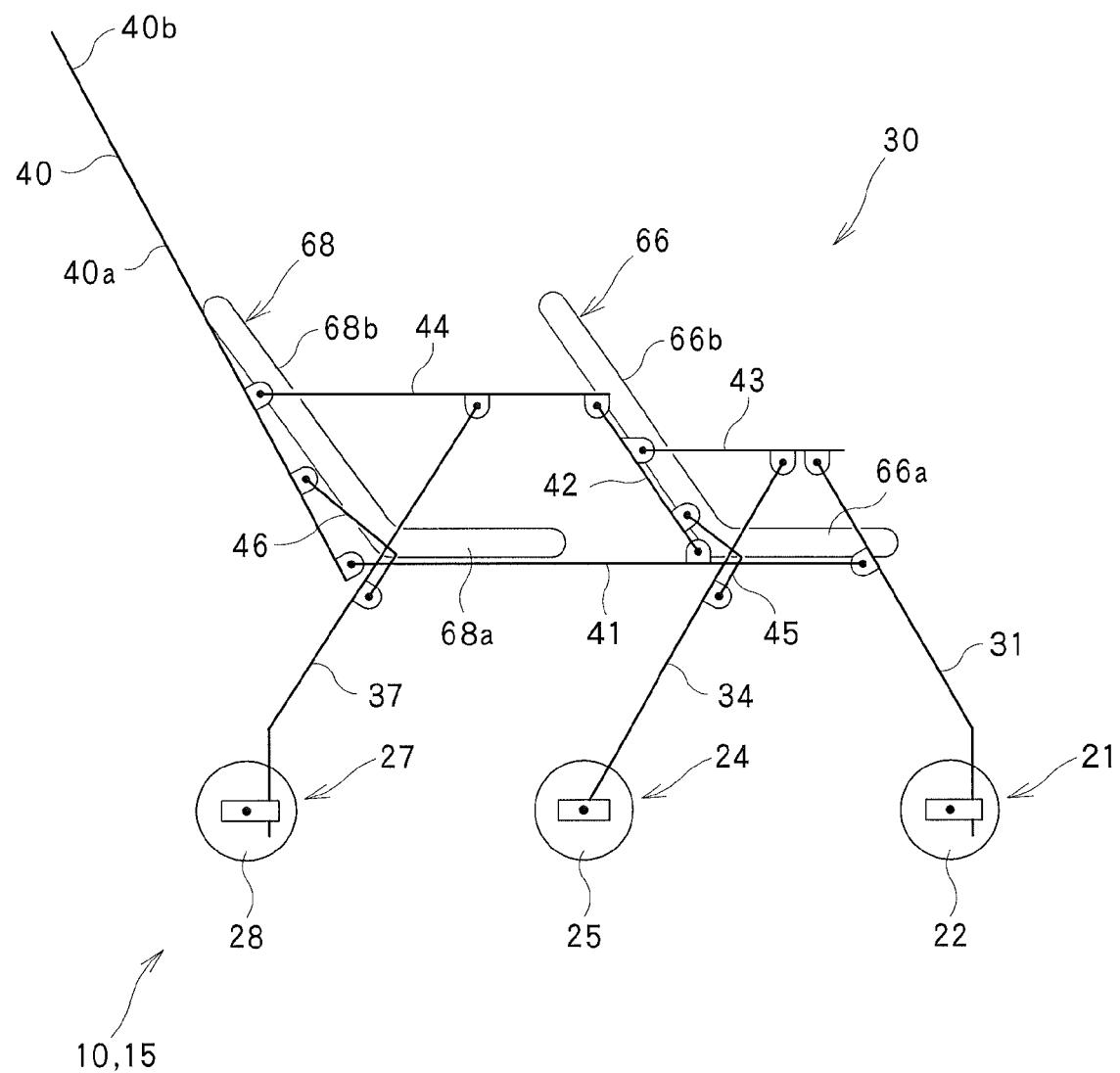
FIG. 4 is a diagrammatic view schematically showing a structure of the stroller in FIG. 1.

In this specification, the terms "front", "rear", "up", "down", "back to front direction", "up and down direction" and "lateral direction" regarding the stroller 10 and the constituent elements of the stroller mean, unless otherwise specified, "front", "rear", "up", "down", "back to front direction" (or "back and front direction"), "up and down direction" and "lateral direction", with respect to an operator who grasps the handle 40 to operate the stroller 10 in the unfolded condition, in particular, the foldable stroller 10 in the unfolded condition. More specifically, the "back to front direction" corresponds to a right and left direction on sheet planes of FIGS. 1 and 4. Unless otherwise specified, the "front" is a side to which the operator who pushes the handle faces. The right side of the sheet planes of FIGS. 1 and 4 is the front. Meanwhile, the "up and down direction" is a direction perpendicular to the back and front direction, and is a direction perpendicular to the ground on which the stroller 10 rests. Thus, when the ground surface is a horizontal surface, the "up and down direction" represents a vertical direction. The "lateral direction" is also a width direction, and is a direction perpendicular both to the "back to front direction" and the "up and down direction".

The stroller 10 is described in more detail below with reference to FIGS. 1 to 4. The stroller 10 as a whole has a substantially symmetrical structure about a central surface in the width direction, which extends along the back to front direction. As can be understood from FIGS. 1 and 4, in the stroller 10 in this embodiment, the frame part 30 includes the pair of right and left front legs 31, the pair of right and left middle legs 34, the pair of right and left rear legs 37, a pair of right and left first link elements 41, a pair of right and left second link elements 42, a pair of right and left third link elements 43, a pair of right and left fourth link elements 44, a pair of right and left fifth link elements 45, a pair of right and left sixth link elements 46, and the handle 40. As can be well understood from FIGS. 1 to 3, the handle 40 has a U-shape, and includes a pair of right and left handle extending parts 40a and a handle connection part 40b extending between the pair of handle extending parts 40a.

As shown in FIG. 4, the first link element 41 is pivotably joined, at a rear portion thereof, in particular, a rear end of the rear portion in the illustrated example, to a lower portion of the corresponding handle extending part 40a of the handle 40, in particular, a lower end of the lower portion of the handle extending part 40a in the illustrated example. In addition, the first link element 41 is pivotably joined, at a front portion thereof, in particular, a front end of the front portion in the illustrated example, to an intermediate portion of the corresponding front leg 31. The second link element 42 is pivotably joined, at a lower portion thereof, in particular, a lower end of the lower portion in the illustrate example, to an intermediate portion of the corresponding first link element 41.

In the stroller 10 shown in FIGS. 1 to 4, the fourth link 44 functions as an armrest for a baby seated on the second seat unit 68. The fourth link element 44 is pivotably joined, at a rear portion thereof, in particular, a rear end of the rear portion in the illustrated example, to a lower portion or an intermediate portion of the corresponding handle extending part 40a of the handle 40. The position at which the fourth link element 44 is joined to the handle extending part 40a of the handle 40 is located above the position at which the first link element 41 is joined to the handle extending part 40a. In addition, the fourth link element 44 is pivotably joined, at a front portion thereof, in particular, a front end of the front portion in the illustrated example, to an upper portion of the corresponding second link element 42, in particular, an upper end of the upper portion of the second link element 42 in the illustrated example.

In the stroller 10 shown in FIGS. 1 to 4, the third link element 43 functions as an armrest for a baby seated on the first seat unit 66. The third link element 43 is pivotably joined, at a rear portion thereof, in particular a rear end of the rear portion in the illustrated example, to an intermediate portion or an upper portion of the corresponding second link element 42. The position at which the third link element 43 is joined to the second link element 42 is located between the position at which the second link element 42 and the fourth link element 44 are joined, and the position at which the second link element 42 and the first link element 41 are joined, in the longitudinal direction of the second link element 42.

The front leg 31 is pivotably joined, at an upper portion thereof, in particular, an upper end of the upper portion in the illustrated example, to a front portion of the corresponding third link element 42, in particular, a front end of the front portion of the third link element 43 in the illustrated example. The middle leg 34 is pivotably joined, at an upper portion thereof, in particular, an upper end of the upper portion in the illustrated example, to a front portion or an intermediate portion of the corresponding third link element 43. The position at which the middle leg 34 is joined to the third link element 43 is located between the position at which the third link element 43 and the second link element 42 are joined, and the position at which the third link element 43 and the front leg 31 are joined, in the longitudinal direction of the third link element 43.

The rear leg 37 is pivotably joined, at an upper portion thereof, in particular, an upper end of the upper portion in the illustrated example, to a front portion or an intermediate portion of the corresponding fourth link element 44. The position at which the rear leg 37 is joined to the fourth link element 44 is located between the position at which the fourth link element 44 and the handle extending part 40a of the handle 40 are joined, and the position at which the fourth link element 44 and the second link element 42 are joined, in the longitudinal direction of the fourth link element 44.

In addition, the frame part 30 includes the left fifth link element 45 connecting the left middle leg 34 and the left second link element 42, and the right fifth link element 45 connecting the right middle leg 34 and the right second link element 42. Each fifth link 45 is pivotably joined, at one portion thereof, to an intermediate portion of the middle leg 34, and is pivotably joined, at another portion thereof, to a lower portion or an intermediate portion of the second link element 42. The position at which the fifth link element 45 is joined to the second link element 42 is located between the position at which the second link element 42 and the first link element 41 are joined, and the position at which the second link element 42 and the third link element 43 are joined, in the longitudinal direction of the second link element 42. Namely, in the illustrated example, when the stroller 10 is viewed from the lateral side, a pivot axis line between the second link element 42 and the fifth link element 45 is displaced from both of a pivot axis line between the second link element 42 and the first link element 41 and a pivot axis line between the second link element 42 and the third link element 43.

Further, the frame part 30 includes the left sixth link element 46 connecting the left rear leg 37 and the left handle extending part 40a of the handle 40, and the right sixth link element 46 connecting the right rear leg 37 and the right handle extending part 40a of the handle 40. Each sixth link element 46 is pivotably joined, at one portion thereof, to an intermediate portion of the rear leg 37, and is pivotably joined, at another portion thereof, to a lower portion or an intermediate portion of the handle extending part 40a of the handle 40. The position at which the sixth link element 46 is joined to the handle extending part 40a of the handle 40 is located between the position at which the handle extending part 40a of the handle 40 and the first link element 41 are joined, and the position at which the handle extending part 40a of the handle 40 and the fourth link element 44 are joined, in the longitudinal direction of the handle extending part 40a of the handle 40. Namely, in the illustrate example, when the stroller 10 is viewed from the lateral side, a pivot axis line between the handle 40 and the sixth link element 46 is displaced from both of a pivot axis line between the handle 40 and the first link element 41 and a pivot axis line between the handle 40 and the fourth link element 44.

In addition, as shown in FIG. 1, there are provided, as members extending in the lateral direction (width direction) of the stroller 10, a first footrest 51 connecting the pair of front legs 31, a second footrest 52 connecting the pair of middle legs 34, and a tray 50 connecting the pair of third link elements 43. Although not shown, a first support member for supporting the first seat unit 66 and a second support member for supporting the second seat unit 68 are disposed between the pair of first link elements 41. Further, as shown FIG. 13 which is described below, there may be provided a middle connection member 51 extending between the pair of middle-wheel holding mechanisms 24 or between the pair of middle legs 34, and a rear connection member 52 extending between the pair of rear-wheel holding mechanisms 24 or between the pair of rear legs 37.

The stroller body 15 is constituted by providing the wheel holding mechanisms 21, 24 and 27 holding wheels 22, 25 and 28 to the frame part 30 as structured above. In the illustrated example, the wheel holding mechanisms 21, 24 and 27 are fixed on lower ends of the corresponding legs 31, 34 and 37.

The front-wheel holding mechanism 21 provided on each front leg 31 is formed as a caster, and is configured to rotatably and turnably support the front wheel 22. Thus, as well shown in FIG. 6, the front wheel 22 of the front-wheel holding mechanism 21 is rotatable about a rotating axis line Ar and is turnable about a turning axis line As which is not in parallel with the rotating axis line Ar. When the front wheel 22 is turned about the turning axis line As, the front wheel 22 is extended in a direction at an angle with respect to the back to the front direction of the stroller 10, and the rotating axis line Ar of the front wheel 22 is extended in a direction at an angle with respect to the width direction of the stroller 10. Similarly, the rear-wheel holding mechanism 27 provided on each rear leg 37 is formed as a caster, and is configured to rotatably and turnably support the rear wheel 28. Thus, as well shown in FIG. 6, the rear wheel 28 of the rear-wheel holding mechanism 27 is rotatable about a rotating axis line Ar, and is turnable about a turning axis line As that is not in parallel with the rotating axis line Ar.

On the other hand, the middle-wheel holding mechanism 24 provided on each middle leg 34 is not formed as a caster. The middle-wheel holding mechanism 24 is configured to rotatably and unturnably support the middle wheel 25. Thus, as well shown in FIG. 6, the middle wheel 25 of the middle-wheel holding mechanism 24 is rotatable about an rotating axis line Ar. Meanwhile, the rotating axis line Ar of the middle wheel 25 is maintained in a constant direction. In the illustrate example, the rotating axis line Ar of the middle wheel 25 is extended in parallel with the width direction of the stroller 10.

The first seat unit 66 and the second seat unit 68 are mounted on the stroller body 15 as structured above. Preferably, the first seat unit 66 and the second seat unit 68 can be attached to and detached from the stroller body 15. The stroller 10 described herein is constituted as a tandem-type stroller for letting babies ride thereon in such a manner that the babies are seated in the back and front. Thus, the first seat unit 66 and the second seat unit 68 are arranged to be aligned in the back and front direction.

In the example shown in FIG. 4, when the stroller 10 is viewed from the lateral side, at least a portion of the first seat unit 66 is located between the front leg 31 and the middle leg 34, and at least a portion of the second seat unit 68, which is positioned rearward of the first seat unit 66, is located between the middle leg 34 and the rear leg 37. To be more specific, the first seat unit 66 and the second seat unit 68 respectively include seat parts 66a and 68a for supporting buttocks of babies, and back parts 66b and 68b facing backs of the babies.

The seat parts 66a and 68a of the respective seat units 66 and 68 are mainly supported by the pair of first link elements 41 and the first and second support members (not shown) provided on the pair of first link elements 41. As shown in FIG. 4, the seat part 68a of the second seat unit 68 is supported by a portion of the first link element 41, the portion being rearward of the position at which the first link element 41 is pivotably coupled to the second link element 42. The back part 68b of the second seat unit 68 is swingable with respect to the seat part 68a. For example, a reclining adjustment belt fixed to the pair of handle extending parts 40a of the handle 40 is disposed on a back side of the back part 68b of the second seat unit 68. By adjusting a length of the reclining adjustment belt, a reclining angle of the back part 68b can be adjusted.

On the other hand, the seat part 66a of the first seat unit 66 is supported by a front portion of the first link element 41, i.e., a portion of the first link element 41, the portion being substantially forward of the position at which the first link element 41 is pivotably coupled to the second link element 42. The back part 66b of the first seat unit 66 is swingable with respect to the seat part 66a. For example, a reclining adjustment belt fixed to the pair of second link elements 42 are disposed on a back side of the back part 66b of the first seat unit 66. By adjusting a length of the reclining adjustment belt, a reclining angle of the back part 66b can be adjusted.

Figure 5:
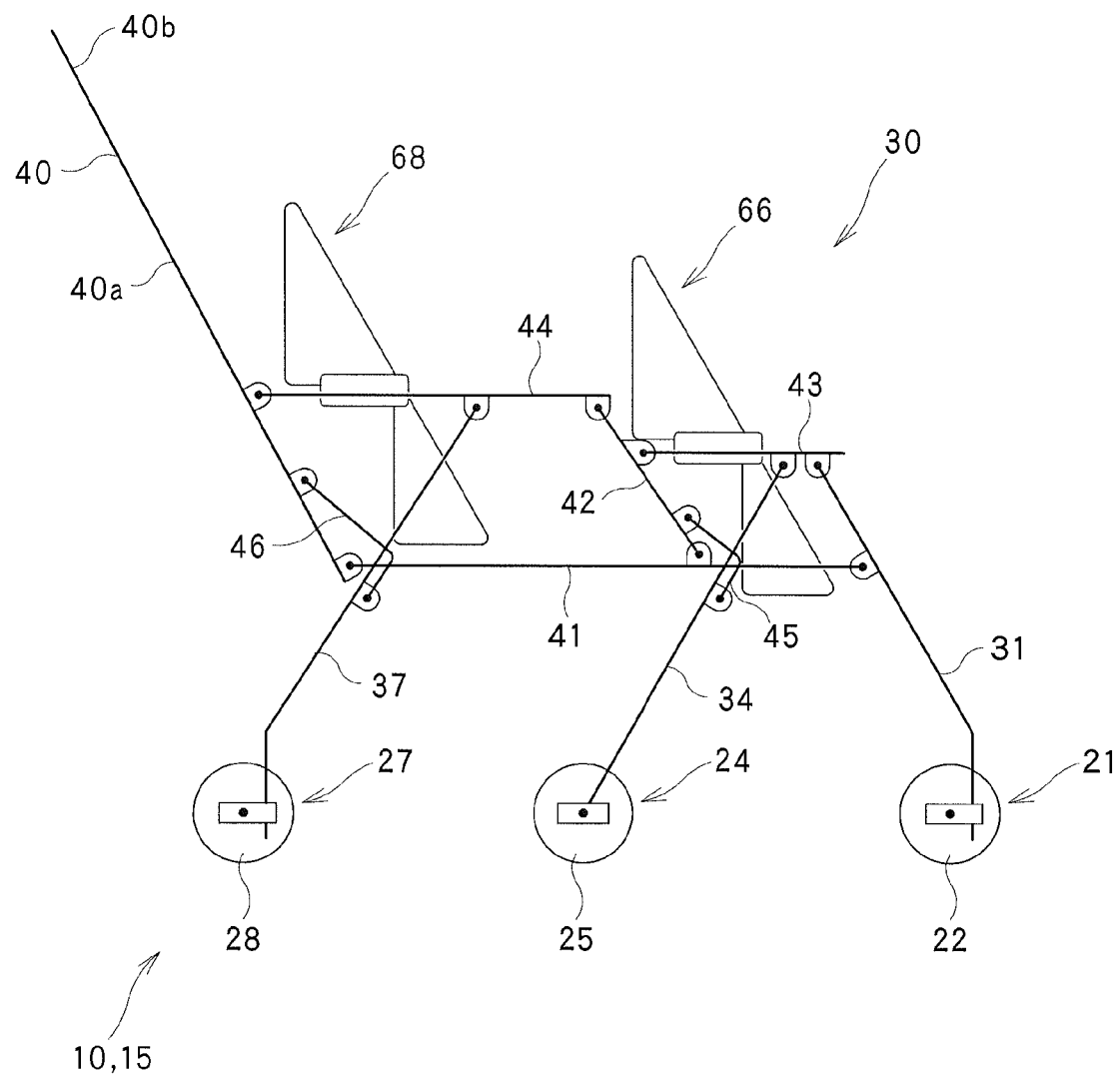
FIG. 5 is a view corresponding to FIG. 4, showing a modification example of a seat unit.

FIG. 5 shows a modification example of the first seat unit 66 and the second seat unit 68. In the modification example shown in FIG. 5, the first seat unit 66 is detachably attached to the third link element 43 of the stroller body 15. The second seat unit 68, which is positioned rearward of the first seat unit 66, is detachably attached to the fourth link element 44 of the stroller body 15. In this example, at least one of the first seat unit 66 and the second seat unit 68 can be attached to the stroller body 15, such that either a baby seated thereon faces forward (illustrated condition) and/or a baby seated thereon faces rearward.

As shown in FIG. 1, the stroller 10 further includes a front hood 61, a rear hood 62 and a basket 63, which are provided on the stroller body 15. The front hood 61 is disposed correspondingly to the first seat unit 66, and functions as a sun shade and a wind shade (protect from the wind) for a baby seated on the first seat unit 66. The rear hood 62 is disposed correspondingly to the second seat unit 68, and functions as a sun shad and a wind shade (protect from the wind) for a baby seated on the second seat unit 68. The basket 63 is disposed below the second seat unit 68. Illustration of the front hood 61, the rear hood 62 and the basket 63 is omitted in the drawings other than FIGS. 1 to 3.

The stroller 10 as structured above can be folded from the unfolded condition shown in FIG. 1 to the folded condition shown in FIG. 3 through the condition shown in FIG. 2. During the folding operation, the respective constituent elements forming the frame part 30 of the stroller body 15 are rotated (pivoted, swung) with each other about an axis line extending in the lateral direction.

The specific folding operation is as follows. Firstly, the handle 40 is once pulled up and then pushed down, so that the fourth link element 44 and the first link element 41 are rotated counterclockwise in FIGS. 1 and 2 with respect to the handle extending part 40a of the handle 40. Due to this operation, when the stroller 10 is viewed from the lateral side, the second link element 42 and the handle extending part 40a of the handle 40 are brought close to each other, in a substantially parallel relationship. In addition, the first link element 41 and the third link element 43 are rotated counterclockwise in FIGS. 1 and 2 with respect to the second link element 42. Due to this operation, when the stroller 10 is viewed from the lateral side, the second link element 42 and the front leg 31 are brought close to each other, in a substantially parallel relationship.

Further, during the folding operation, the middle leg 34 joined to the fifth link element 45 is rotated clockwise in FIGS. 1 and 2 with respect to the third link element 43. Similarly, the rear leg 37 joined to the sixth link element 46 is rotated clockwise in FIGS. 1 and 2 with respect to the fourth link element 44.

As shown in FIG. 3, as a result of the above folding operation, when the stroller 10 is viewed from the lateral side, the handle 40, the rear leg 37, the second ink element 42, the middle leg 34 and the front leg 31 are close to each other in substantially parallel with each other, with the handle 40 being located on a lower position. In the above manner, the stroller 10 can be folded, so that dimensions of the stroller 10 can be reduced along the back and front direction of the stroller 10 and along the up and down direction thereof. On the other hand, in order to unfold the stroller 10 in the folded condition shown in FIG. 3 to the unfolded condition shown in FIG. 1 through the condition shown in FIG. 2, the above folding steps are reversely performed.

As described above, a conventional stroller for letting babies ride thereon in such a manner that the babies are seated in the back to front direction has a problem of significantly poor steerability, which is caused by the long overall length of the stroller in the back to front direction. Such a problem of the conventional stroller is described with reference to FIG. 7. A conventional stroller 110 schematically illustrated in FIG. 7 includes a pair of front-wheel holding mechanisms 121 and a pair of rear-wheel holding mechanisms 127. The pair of front-wheel holding mechanisms 121 are formed as casters, and are configured to rotatably and turnably hold front wheels 122. The pair of rear-wheel holding mechanisms 127 are not formed as casters, and are configured to rotatably and unturnably hold rear wheels 128.

Figure 7:
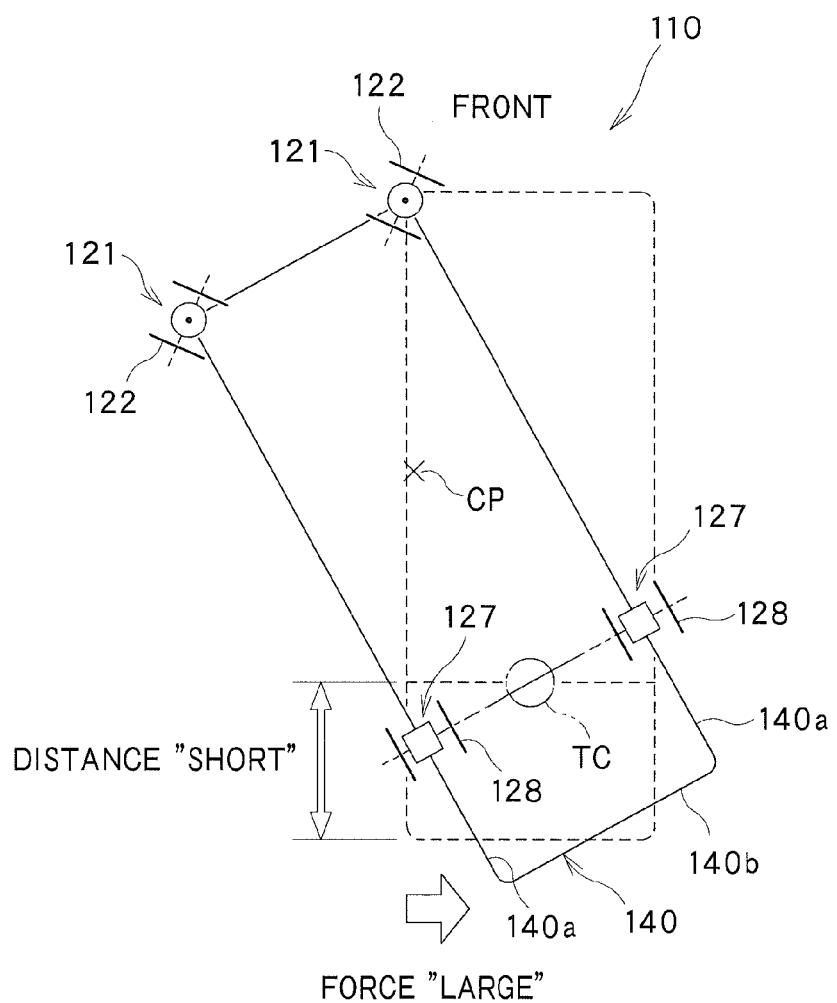
FIG. 7 is a view for illustrating the action of a conventional stroller being turned.

When such a stroller 110 travels along a curved path, namely, when such a stroller 110 turns, as shown in FIG. 7, the stroller 110 is turned about a turning center TC located near to the rear wheels in the back and front direction, so as to change a traveling direction of the stroller 110 from the traveling direction indicated by the dotted line in FIG. 7 to the traveling direction indicated by the solid line in FIG. 7, omitting a movement component in the back and front direction of the stroller 110. At this time, a steering person of the stroller 110 grasps a handle connection part 140b of a handle 140 and applies a force for changing the traveling direction of the stroller 110 along the width direction of the stroller 110.

However, a distance along the back to front direction of the stroller from the handle 140, to which the force for operation is added, to a turning center TC is short. On the other hand, the tandem-type stroller 10 has a large length in the back and front direction. Accordingly, a center position CP of a weight including a weight of the stroller itself and weights of babies seated on the stroller is distant away from the turning center TC along the back and front direction. In the first place, since a plurality of babies are placed on the tandem-type stroller 110, a large force is required for steering the stroller 110. As a result of the above, a larger force is required for turning the conventional stroller 110, which significantly impairs the steerability of the stroller 110.

In addition, as described above, since a large force is applied to the conventional stroller 110, it is necessary to make rigid the structural components of the stroller 110 including the handle 140. As a result, a total weight of the stroller 110 is increased, which further increases a force required for steering the stroller 110, resulting in further degradation in steerability of the stroller 110.

In order to eliminate such a problem, it can be considered that the length of the stroller 110 in the back to front direction is reduced. However, when the length of the stroller 110 in the back to front direction is reduced, livability or spaciousness in the stroller 110 is significantly degraded.

Figure 6:
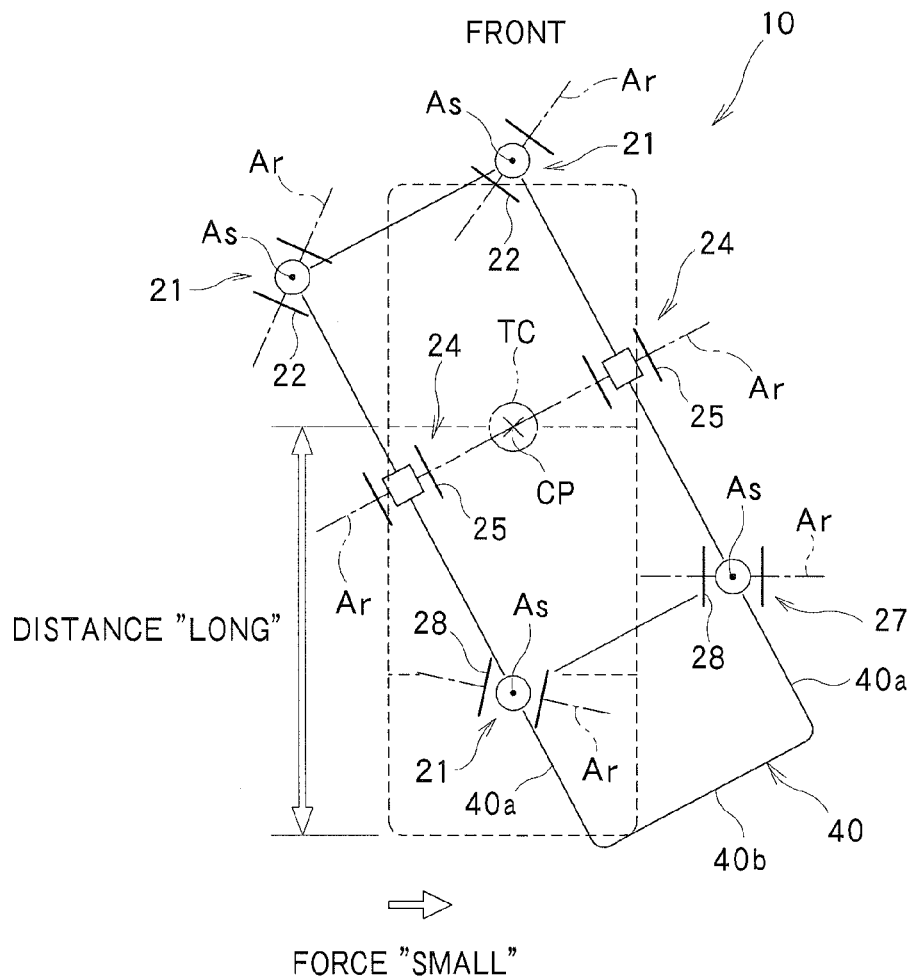
FIG. 6 is a view illustrating the action of the stroller that is being turned.

On the other hand, as described above, the stroller 10 in this embodiment further includes the middle legs 34, in addition to the front legs 31 and the rear legs 37. In addition, the stroller 10 includes the front-wheel holding mechanisms 21 provided on the front legs 31, which are formed as casters, the middle-wheel holding mechanisms 24 provided on the middle legs 34, which are not formed as casters, and the rear-wheel holding mechanisms 27 provided on the rear legs 37, which are formed as casters. Thus, when the stroller 10 is turned, as shown in FIG. 6, the stroller 10 is turned about a turning center TC located near to the middle wheels in the back and front direction, so as to change a traveling direction (facing direction) of the stroller 10 from the traveling direction indicated by the dotted line in FIG. 6 to the traveling direction indicated by the solid line in FIG. 6, omitting a movement component in the back and front direction of the stroller 10.

Thus, the distance of the stroller 10 along the back to front direction, from the handle connection part 40b of the handle 40, to which a steering person of the stroller 10 applies a force for steering the stroller 10, to the turning center TC can be elongated. Therefore, a force to be applied to the handle 40 for steering the stroller 10 can be significantly decreased. As a result, the steerability of the stroller 10 is significantly improved.

Furthermore, as shown in FIG. 4, when the stroller 10 is viewed from the front side, it is possible to locate the middle leg 34 and the middle-wheel holding mechanism 24 substantially between the first seat unit 66 and the second seat unit 68. In this case, a center position CP of a weight including the weight of the stroller itself and weights of babies on the stroller 10 can be located near to the middle wheel 25 in the back to front direction of the stroller 10. That is to say, as shown in FIG. 6, in the stroller 10 in this embodiment, the turning center TC about which the stroller 10 is turned so as to change a traveling direction of the stroller, and the center position CP of the weight of the stroller 10 can be located close to each other, and further the turning center TC and the center position CP can be at the same position in the back and front direction of the stroller 10. Thus, according to this embodiment, a moment required for changing a traveling direction of the stroller 10 can be significantly lowered.

Accordingly, a force to be applied to the handle 40 by a steering person when the stroller 10 is turned can be significantly effectively reduced. Thus, the steerability of the stroller 10 is significantly effectively improved. In addition, since a large force is not applied to the respective constituent elements of the stroller 10, the respective constituent elements can be simplified and reduced in weight. Thus, the steerability is further improved, as well as the manufacturing is the stroller 10 can be lowered. Furthermore, since it is not necessary to reduce the size of the stroller 10, in particular, the overall length thereof along the back to front direction, with a view of improvement in steerability, degradation in livability or spaciousness of the stroller 10 as well as comfortableness of the stroller 10 is avoided.

Moreover, in this embodiment, the tandem-type stroller 10 having a long overall length in the back to front direction is provided with, in addition to the front legs 31 and the rear legs 37, the middles legs 34 disposed between the front legs 31 and the rear legs 37. Thus, weights of babies on the stroller 10 is supported in a well balanced manner. In conjunction therewith, also in the foldable-type stroller 10 in which the respective constituent elements of the stroller 10 are rotatable with each other, deformation such as deflection of the stroller 10 can be effectively restrained. Also from these points, the steerability of the stroller 10 is effectively enhanced.

The aforementioned embodiment can be variously modified. An example of the modification will be described below. In the following description and the following drawings used in the description, a component that can be constituted similarly to that of the aforementioned embodiment and other modification examples is shown by the same reference symbol used for the corresponding component of the aforementioned embodiment and other modification examples, and overlapping explanation is omitted.

For example, in the aforementioned embodiment, the two seat units, i.e., the first seat unit 66 and the second seat unit 68 are arranged in the back to front direction. However, not limited thereto, three or more seat units may be disposed on the stroller 10. For example, three or more seat units may be arranged on the stroller 10 in the back to front direction. Alternatively, the stroller 10 may include two seat units, which are arranged in the width direction of the stroller 10, and two seat units, which are arranged in the width direction of the stroller 10 and rearward of the former two seat units.

For example, the detailed structures of the stroller 10 as described above are nothing more than mere examples. For example, the aforementioned embodiment shows the example in which there are provided the pair of front legs 31 located to be spaced apart from each other in the width direction, the pair of middle legs 34 located to be spaced apart from each other in the width direction, the pair of rear legs located to be spaced apart from each other in the width direction, the pair of first link elements 41 located to be spaced apart from each other in the width direction, the pair of second link elements 42 located to be spaced apart from each other in the width direction, the pair of third link elements 43 located to be spaced apart from each other in the width direction, the pair of fourth link elements 44 located to be spaced apart from each other in the width direction, the pair of fifth link elements 45 located to be spaced apart from each other in the width direction, and the pair of sixth link elements 46 located to be spaced apart from each other in the width direction. In this example, the front leg 31, the middle leg 34, the rear leg 37 and the first to sixth link elements 41 to 46, which are positioned on one side in the width direction (e.g., on the right side), are connected to each other so as to form a link structure for enabling the folding operation of the stroller body 15. Similarly, the front leg 31, the middle leg 34, the rear leg 37 and the first to sixth link elements 41 to 46, which are positioned on the other side in the width direction (e.g., on the left side) are connected to each other so as to form a link structure for enabling the folding operation of the stroller body 15. The front-wheel holding mechanism 22 including the front wheel 22 is disposed on each of the pair of front legs 31. The middle-wheel holding mechanism 24 including the middle wheel 25 is disposed on each of the pair of middle legs 34. The rear-wheel holding mechanism 27 including the rear wheel 28 is disposed on each of the pair of rear legs 37. However, not limited to this example, one of the pair of front legs 31, the pair of middle legs 34 and the pair of rear legs 37 may be formed in a U-shape, and the only one front-wheel holding mechanism 21, the only one middle-wheel holding mechanism 24 or the only one rear-wheel holding mechanism 27 may be provided.

Figure 8:
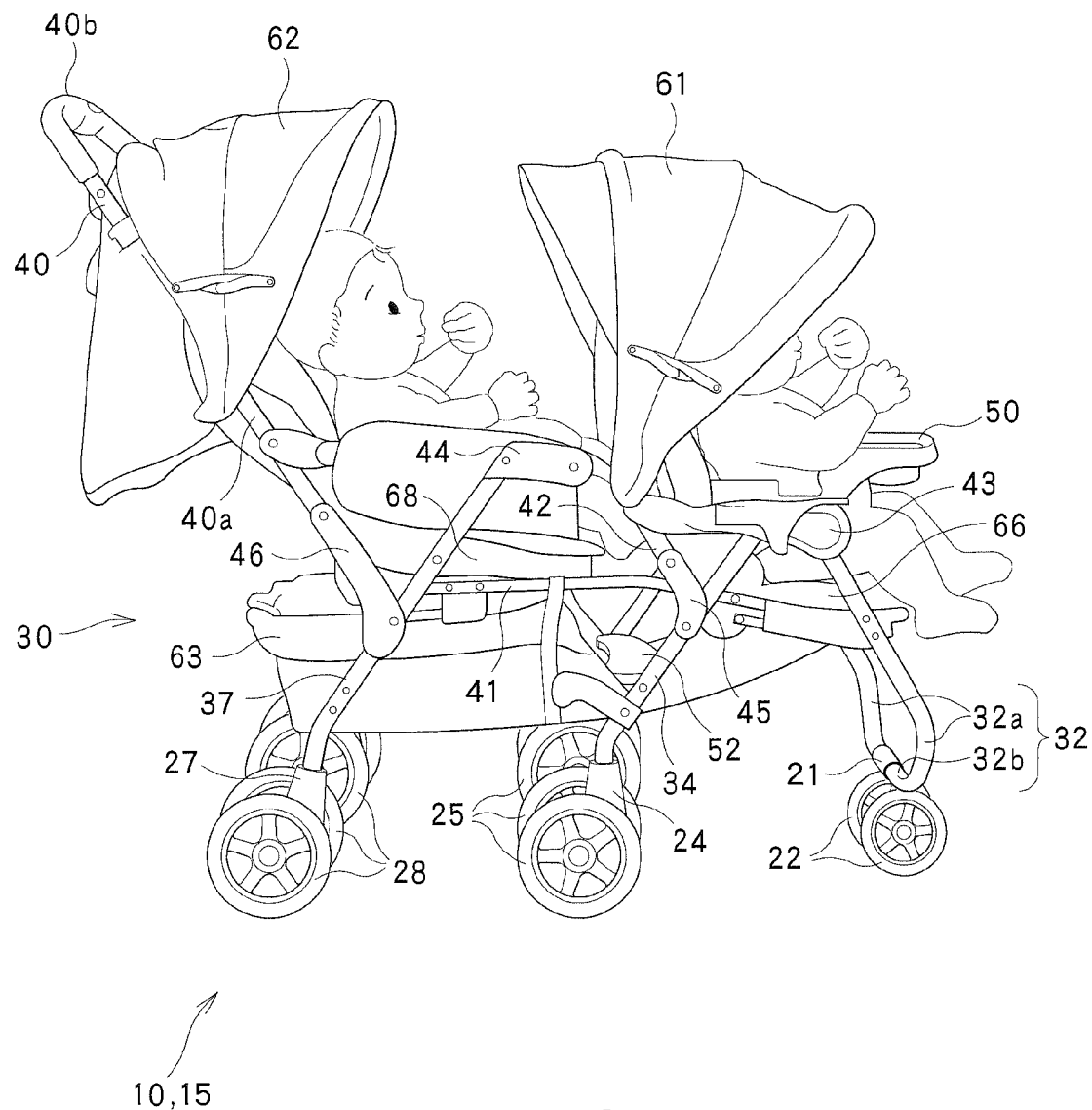
FIG. 8 is a view corresponding to FIG. 1, showing a modification example of the stroller.

As an example, FIG. 8 shows that the front leg 32 includes a pair of front-leg extending parts 32a, and a front-leg connection part 32b connecting the pair of front-leg extending parts 32a. In the illustrated example, the front-leg connection part 32 extends between lower ends of the pair of front-leg extending parts 32a. In particular, in the example shown in FIG. 8, the front leg 32 is integrally formed in a U-shape. Such a front leg may be manufactured by, for example, bending a pipe made of metal such as aluminum alloy. Similarly to the front leg 31 in the aforementioned embodiment, each front-leg extending part 32a is joined to the first link element 41 and the third link element 43. On the other hand, the front-wheel holding mechanism 22 including the front wheel 21 is not disposed on each front-leg extending part 32a but disposed on the front-leg connection part 32b. Namely, the stroller 10 shown in FIG. 8 is a five-wheel stroller. Such a stroller 10 can provide the same effect as that of the aforementioned embodiment, as long as the front wheel 22 and the rear wheel 28 are rotatably and turnably held, while the middle wheel 25 is rotatably and unturnably held. Namely, it is possible to improve the steerability of a stroller capable of letting babies ride thereon in such a manner that the babies are seated in the back to front direction. By the same steps as those in the aforementioned embodiment, the stroller 10 can be folded, which is shown in FIG. 9, and the folded stroller 10 can be unfolded.

Figure 10:
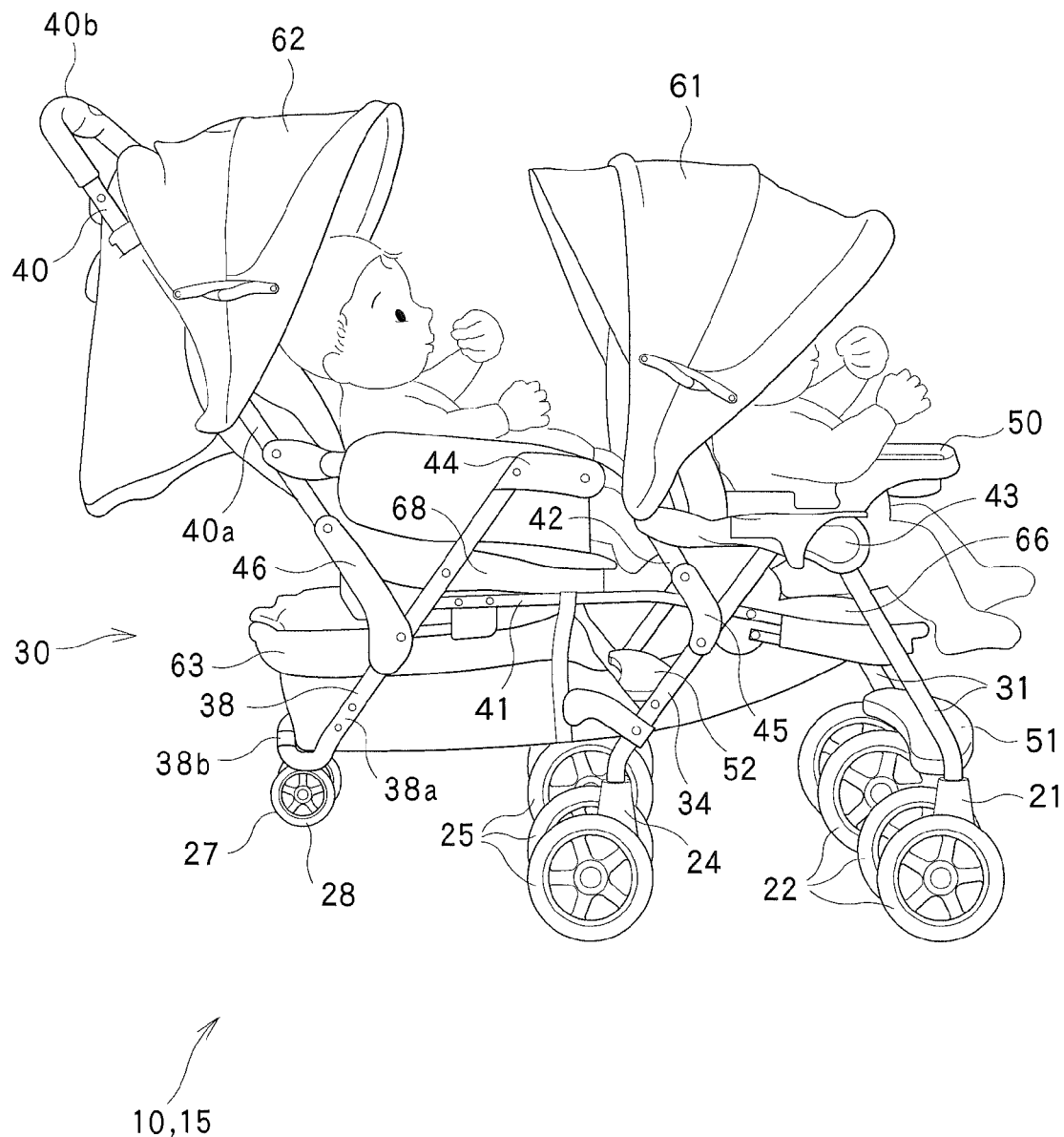
FIG. 10 is a view corresponding to FIG. 1, showing another modification example of the stroller.

Further, FIG. 10 shows an alternative example in which the rear leg 38 includes a pair of rear-leg extending parts 38a, and a rear-leg connection part 38b connecting the pair of rear-leg extending parts 38a. In the illustrated example, the rear-leg connection part 38b extends between lower ends of the pair of rear-leg extending parts 38a. In particular, in the example shown in FIG. 10, the rear leg 38 is integrally formed in a U-shape. Such a rear leg may be manufactured by, for example, bending a pipe made of metal such as aluminum alloy. Similarly to the rear leg 37 in the aforementioned embodiment, each rear-leg extending part 38a is joined to the sixth link element 46 and the fourth link element 44. On the other hand, the rear-wheel holding mechanism 27 including the rear wheel 28 is not disposed on each rear-leg extending part 32a but disposed on the rear-leg connection part 38b. Namely, the stroller 10 shown in FIG. 8 is a five-wheel stroller. Such a stroller 10 can provide the same effect as that of the aforementioned embodiment, as long as the front wheel 22 and the rear wheel 28 are rotatably and turnably held, while the middle wheel 25 is rotatably and unturnably held. Namely, it is possible to improve the steerability of a stroller capable of letting babies ride thereon in such a manner that the babies are seated in the back to front direction. Following the same steps as those in the aforementioned embodiment, the stroller 10 can be folded, and the folded stroller 10 can be unfolded.

Figure 9:
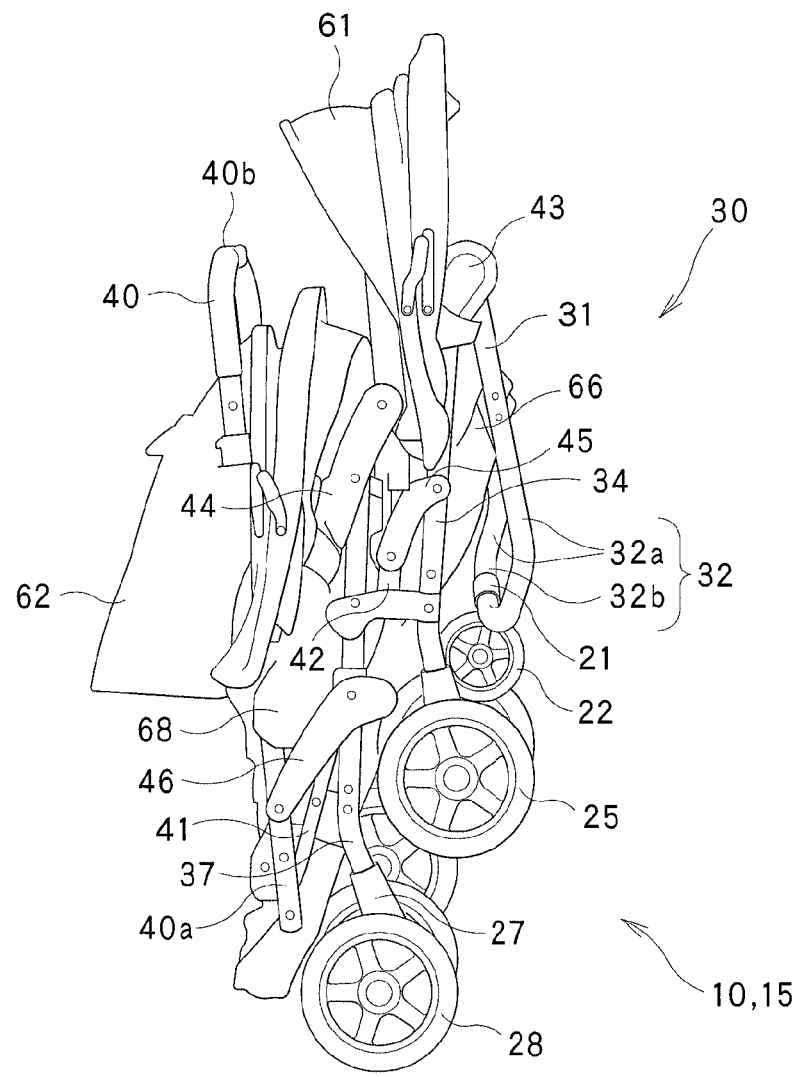
FIG. 9 is a view corresponding to FIG. 3, showing the stroller in FIG. 8 in the folded condition.

Further, not limited to the examples shown in FIGS. 8 to 10, the front leg may include a pair of front-leg extending parts and a front-leg connection part connecting the pair of front-leg extending parts, and the rear leg may include a pair of rear-leg extending parts and a rear-leg connection part connecting the pair of rear-leg extending parts. In this example, the front-wheel holding mechanism may be provided on the front-leg connection part, the middle-wheel holding mechanism may be provided on each middle leg, and the rear-wheel holding mechanism may be provided on the rear-leg connection part. On the other hand, the middle leg may be formed in a U-shape and the only one middle-wheel holding mechanism 24 holding the middle wheel 25 may be provided. Also in this example, there can be provided the same effect as that of the aforementioned embodiment, as long as the front wheel 22 and the rear wheel 28 are rotatably and turnably held, while the middle wheel 25 is rotatably and unturnably held.

Figure 11:
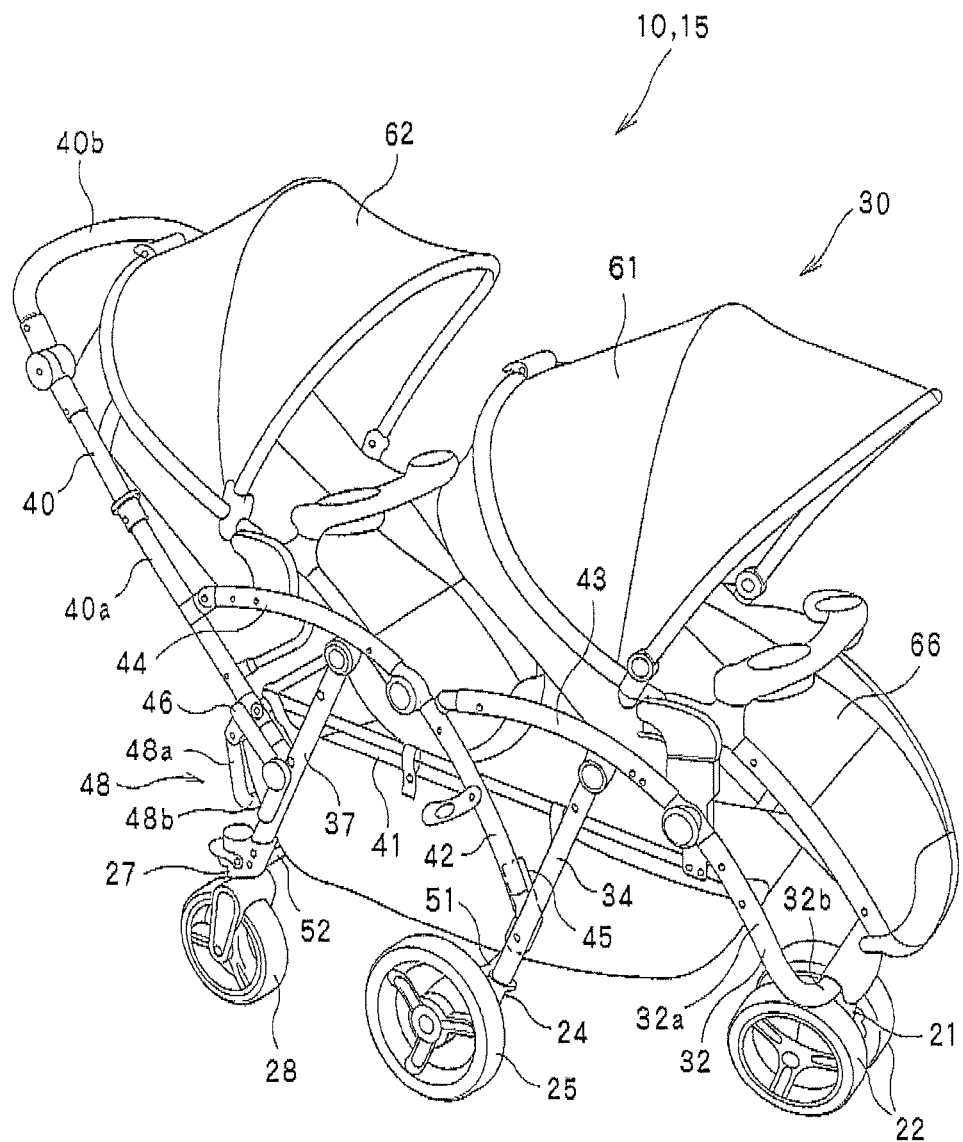
FIG. 11 is a view corresponding to FIG. 1, showing yet another modification example of the stroller.
Figure 12:
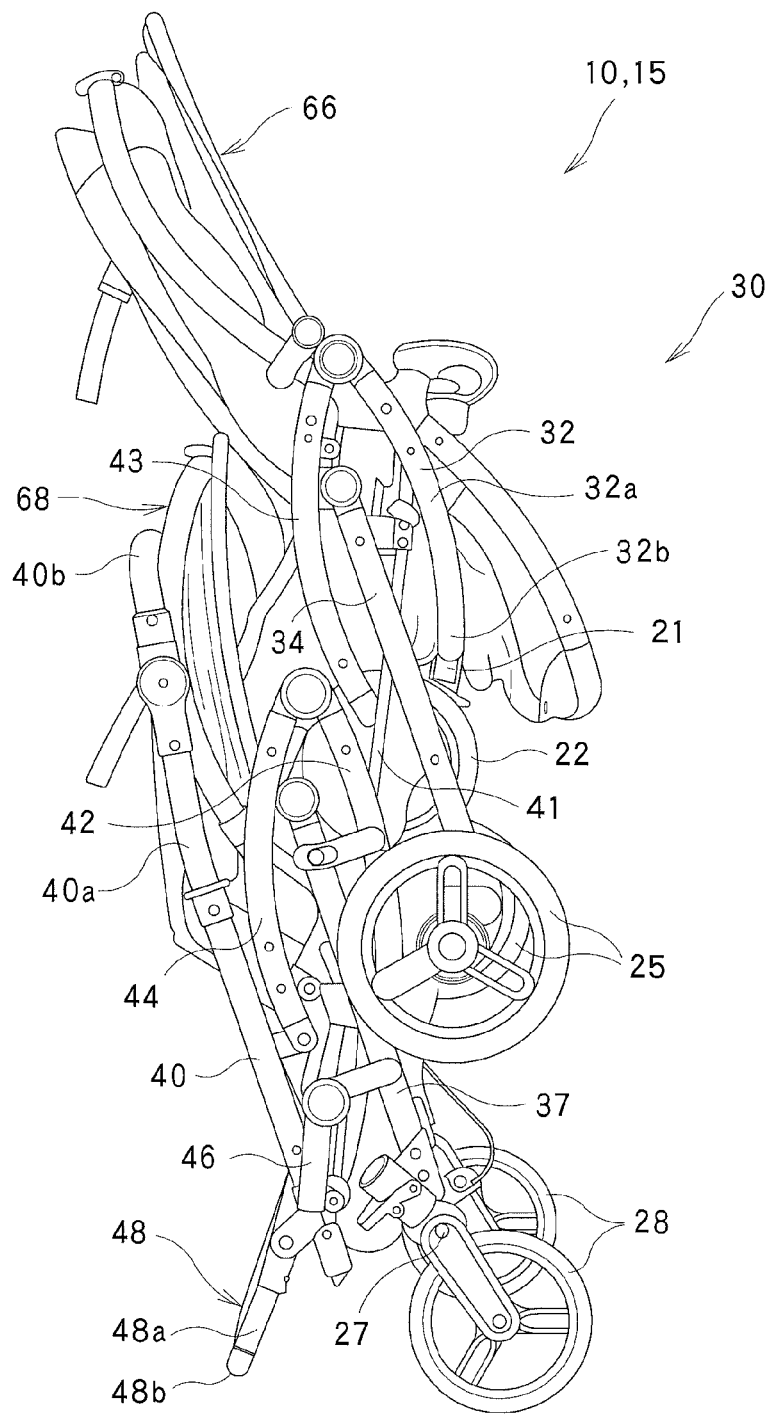
FIG. 12 is a view corresponding to FIG. 3, showing the stroller in FIG. 11 in the folded condition.

Further, in the aforementioned embodiment, there is described the example in which the stroller 10 is configured to be foldable. As shown in FIGS. 11 and 12, when the stroller 10 is foldable, the folded stroller 10 can preferably stand by itself. Similarly to the stroller in the aforementioned embodiment, the stroller 10 shown in FIGS. 11 and 12 includes a front leg 31, a middle leg 34, a rear leg 37, first to sixth link elements 41 to 46, a front-wheel holding mechanism 21, a middle-wheel holding mechanism 24, a rear-wheel holding mechanism 27, and a handle 40. In addition, the front-wheel holding mechanism 21 and the rear-wheel holding mechanism 27 hold the wheels 22 and 28 rotatably and turnably, while the middle-wheel holding mechanism 24 holds the middle wheel 25 rotatably and unturnably. In addition, the stroller 10 shown in FIGS. 11 and 12 further includes a stand member 48 attached to lower portion of the handle 40, in particular, in the illustrated example, lower ends of the handle 40. The stand member 48 shown in FIGS. 11 and 12 includes a pair of stand extending parts 48a respectively extending from the lower portions of the pair of handle extending parts 40a of the handle 40, and a stand connection part 48b connecting the pair of stand extending parts 48a. The stand member 48 is formed in a substantially U-shape. As shown in FIG. 12, the folded stroller 10 can stand by itself, with only the pair of rear wheels 28 and the stand connection part 48b of the stand member 48 being grounded.

In the example shown in FIGS. 11 and 12, the stand member 48 is preferably swingable with respect to the handle 40. Otherwise, the stand member 48 projects when the stand member 48 is not used to enlarge the size of the stroller 10. Thus, such a structure prevents enlargement of the stroller 10 in size. In the example shown in FIGS. 11 and 12, the stand member 48 is swingably attached to the handle 40. When no external force is applied, the stand member 48 is urged to be separated from the rear wheel 28 with respect to the handle 40, such that the illustrated stroller 10 can stand by itself. On the other hand, the stand member 48 can be swung to come close to the rear wheel 28 against the urging force. For example, when the folded stroller 10 shown in FIG. 12 is placed in flat such that the handle 40 is directed downward, the stand member 48 is swung with respect to the stroller body 15 by a self weight of the stroller 10 so as to come close to the rear wheel 28. Thus, the thickness of the folded stroller 10 can be reduced to achieve small folded dimensions.

Although not specifically mentioned in the aforementioned embodiment, the stroller 10 may include a braking mechanism that restricts rotation of the wheel. In this case, the braking mechanism is preferably configured to restrict the rotation of the middle wheel that is unturnably held. In this case, the braking mechanism can be made smaller and simplified. The rotation of the middle wheel can be more reliably restricted by the small and simple braking mechanism, whereby the stroller 10 can be stably maintained at rest. Herebelow, referring mainly to FIGS. 13 to 19, there is described an example in which the stroller 10 includes a braking mechanism 70 capable of restricting rotation of a middle wheel 71.

Figure 13:
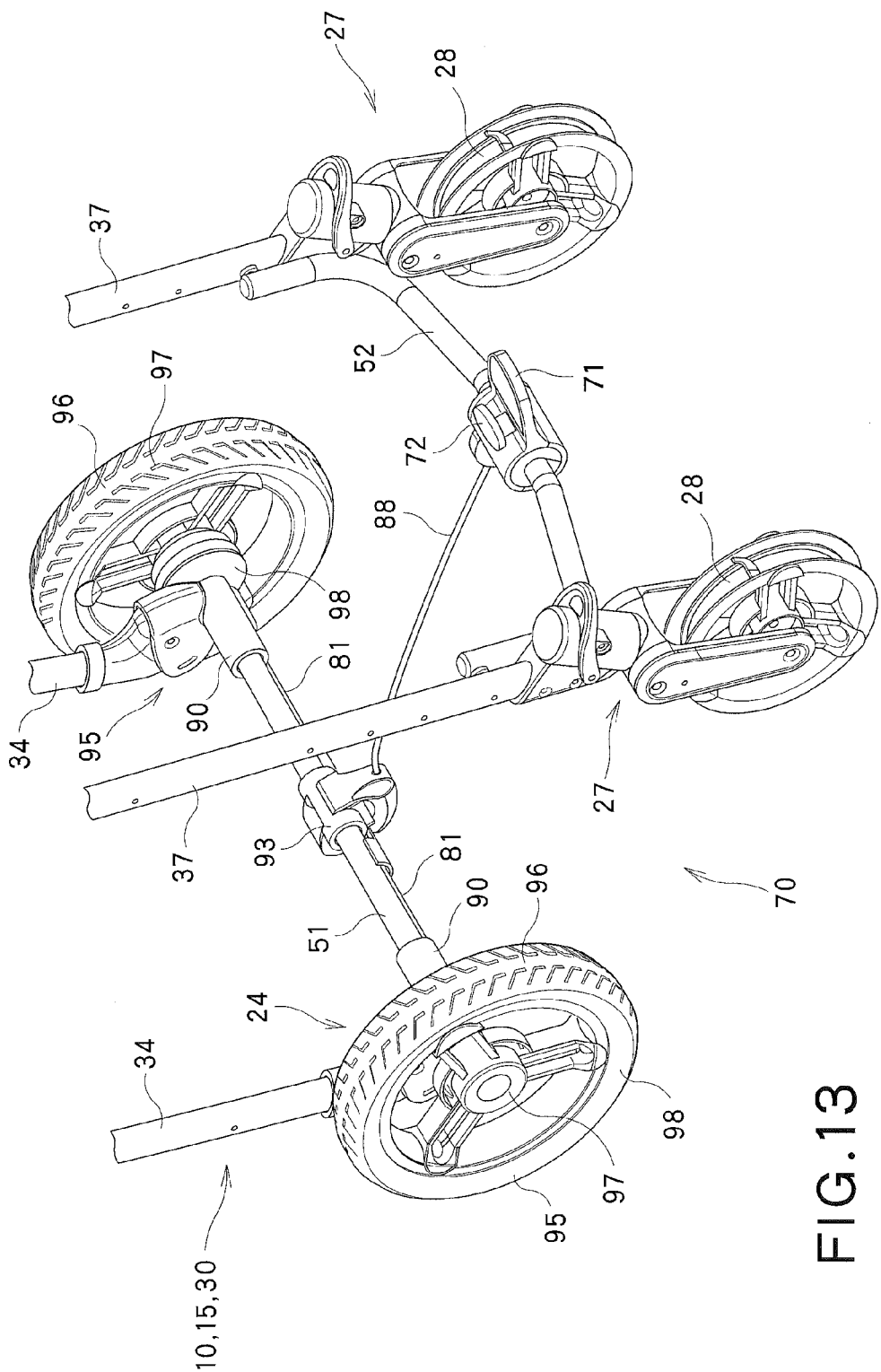
FIG. 13 is a perspective view showing a part where a braking mechanism of the stroller is provided.

FIG. 13 shows lower portions of the middle legs 34 and the rear legs 37. As shown in FIG. 13, the pair of middle legs 34 are provided, and the middle-wheel holding mechanisms 95 are attached to the lower ends of the respective middle legs 34. The middle connection member 51 is provided between the pair of middle-wheel holding mechanisms 95, and the pair of middle-wheel holding mechanisms 95 are connected to each other by the middle connection member 51. In addition, the rear connection member 52 is provided between the pair of rear legs 37, and the pair of rear legs 37 are connected to each other by the rear connection member 52. The rear-wheel holding mechanisms 27 are attached to the lower ends of the respective rear legs 37.

The middle-wheel holding mechanism 95 attached to the middle connection member 51 supports the middle wheel 96 so as to be rotatable about an axis (longitudinal center line) of the middle connection member 51 extending in the width direction. The middle wheel 96 includes a wheel 98 rotatably supported on the middle connection member 51 and a tire 97 mounted on the wheel 98. In an inner surface of the wheel 98, a plurality of locking recesses 99 are formed to be spaced apart from each other along a circumference about a rotational axis of the middle wheel 96. The illustrated braking mechanism 70 includes shaft members 81 that are supported movably in the width direction with respect to the middle connection member by outer casings 90 attached to the middle connection member 51 and an inner casing 93 attached the middle connection member 51. When an outer end 81b of the shaft member 81 gets into the locking recess 99 of the middle wheel 96, the rotation of the middle-wheel holding mechanism 95 is restricted. Respective structures of the braking mechanism 70 are described herebelow.

Figure 14:
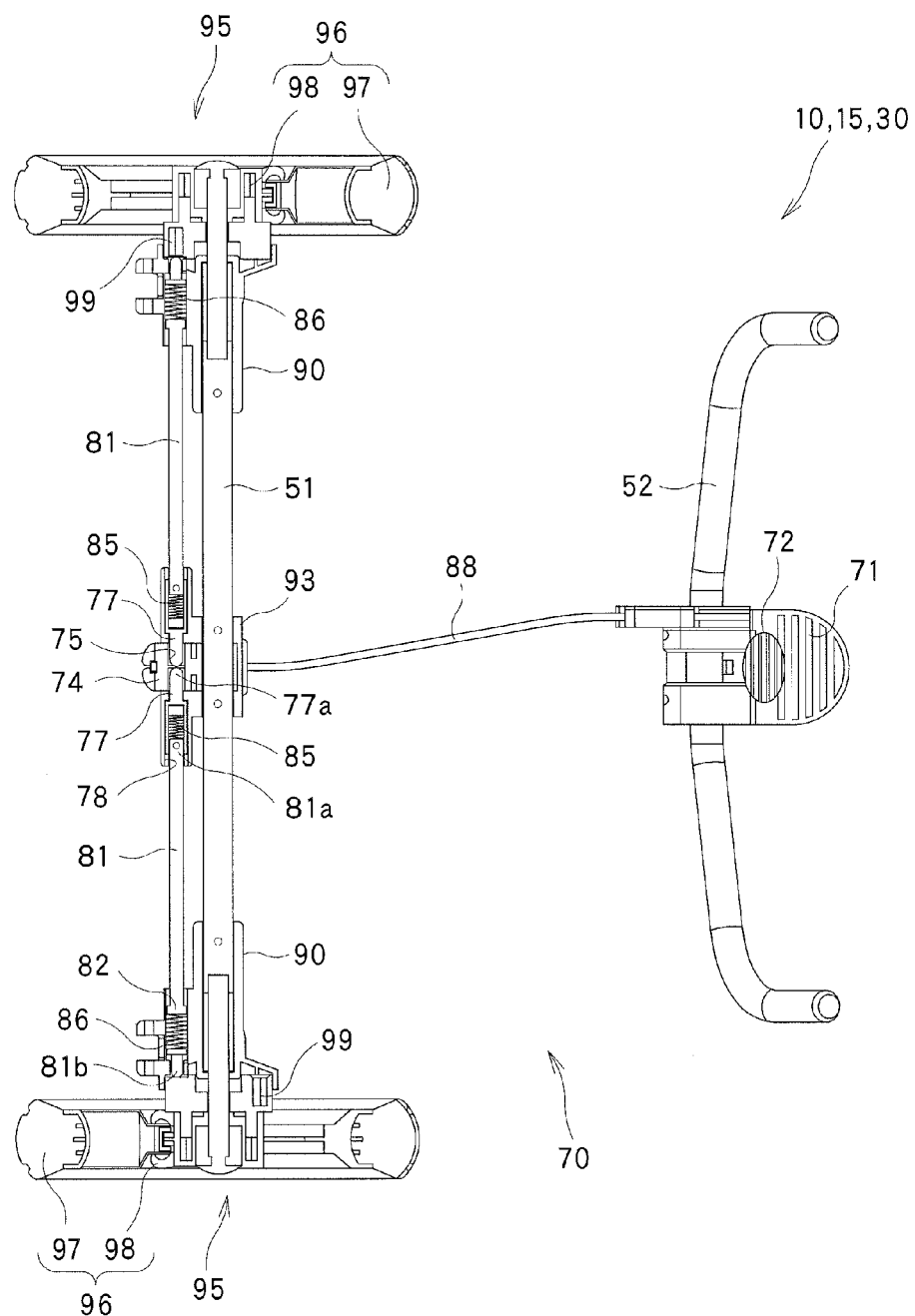
FIG. 14 is a cross-sectional view of the part where the braking mechanism of the stroller is provided.

As shown in FIG. 14, the braking mechanism 70 includes a cam member 74 which is disposed on a position between the pair of middle-wheel holding mechanisms 95 or a position between the pair of middle legs 34, the shaft members 81 respectively disposed between the cam member 74 and the one middle wheel 96 and between the cam member 74 and the other middle wheel 96, and socket members 77 respectively disposed between the cam member 71 and the one shaft member 81 and between the cam member 71 and the other shaft member 81. As described above, the respective shaft members 81 are supported between the respective outer casings 90 and the inner casing 93. On the other hand, the cam member 74 and the pair of socket members 77 are supported by the inner casing 93. The inner casing 93 is fixed on a central portion of the middle connection member 51 in the width direction. The outer casings 90 are respectively fixed on outer end portions of the middle connection member 51 in the width direction. Each of the outer casings 90 is opposed to the wheel 98 of the middle wheel 96 from inside in the width direction. The outer casing 90 has an outer opening 91 on a position opposed to the locking recess 99 of the middle wheel 96. The outer end 81b of the shaft member 81 is engaged with the middle wheel 96 through the outer opening 91.

Figure 15:
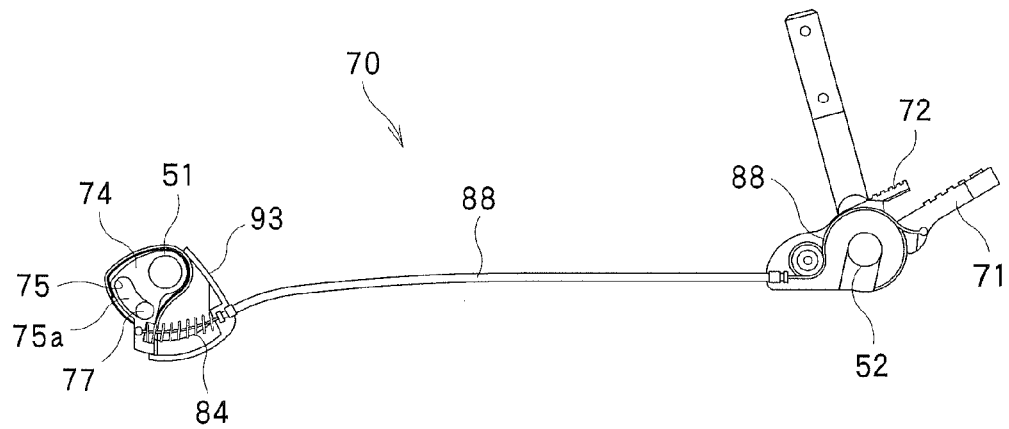
FIG. 15 is a longitudinal sectional view of the part where the braking mechanism of the stroller is provided.
Figure 16:
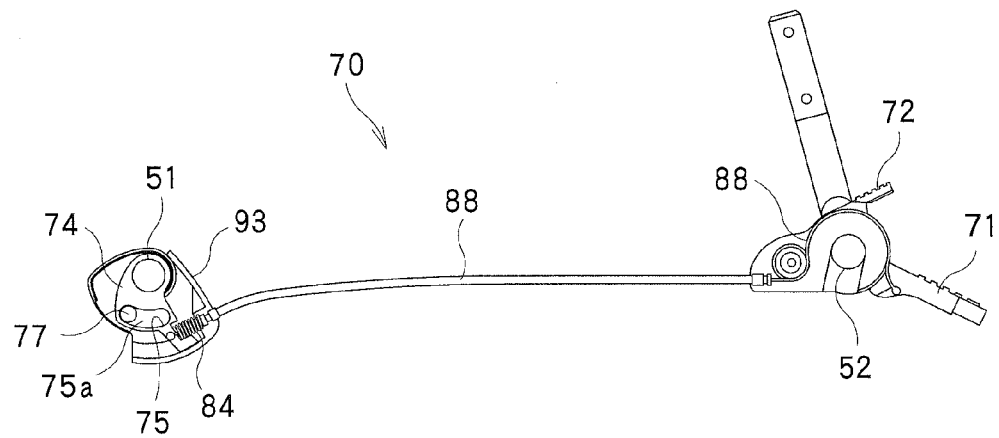
FIG. 16 is a view corresponding to FIG. 15, showing the braking mechanism in a condition different from the condition shown in FIG. 15.

The cam member 74 can be moved between a first position shown in FIG. 15 and a second position shown in FIG. 16. In the examples shown in FIGS. 15 and 16, by being rotated about an axial direction of the middle connection member 51, the cam member 74 is movable between the first position and the second position. In a pair of side surfaces facing outward in the width direction, the cam member 74 has a receiving recess 75 formed along a part of a circumference about a rotational axis thereof. A bottom surface of the receiving recess 75 forms a cam surface 75a which varies a position in the width direction. As shown in FIGS. 15 and 16, a central urging member 84 formed of, e.g., a compression spring, is disposed in the inner casing 93. The central urging member 84 urges the cam member 74 from the second position to the first position.

The socket member 77 is formed as an elongate member extending in the axial direction of the middle connection member 51. An inner end 77a of each socket member 77, which is an inner end portion in the width direction, is placed in the receiving recess 75 of the cam member 74 and is in contact with the cam surface 75a. On the other hand, an outer recess 78 opening outward in the width direction is formed in an outer end of each socket member 77. An inner end 81a in the width direction of the shaft member 81 is located in the outer recess 78 of the socket member 77.

In addition, the braking mechanism 70 further includes a first urging member 85 that urges the shaft member 81 outward in the width direction, and a second urging member 86 that urges the shaft member 81 inward in the width direction. The first urging member 85 is formed of, e.g., a compression spring, and is arranged between the outer recess 78 of the socket member 77 and the inner end 81a of the shaft member 81. The second urging member 86 is formed of, e.g., a compression spring, and is arranged between an outer flange 82 of each shaft member 81 and a stepped part 92 formed around the outer opening 91 of the outer casing 90, such that the outer end 81b of each shaft member 81 passes through the second urging member 86.

Figure 17:
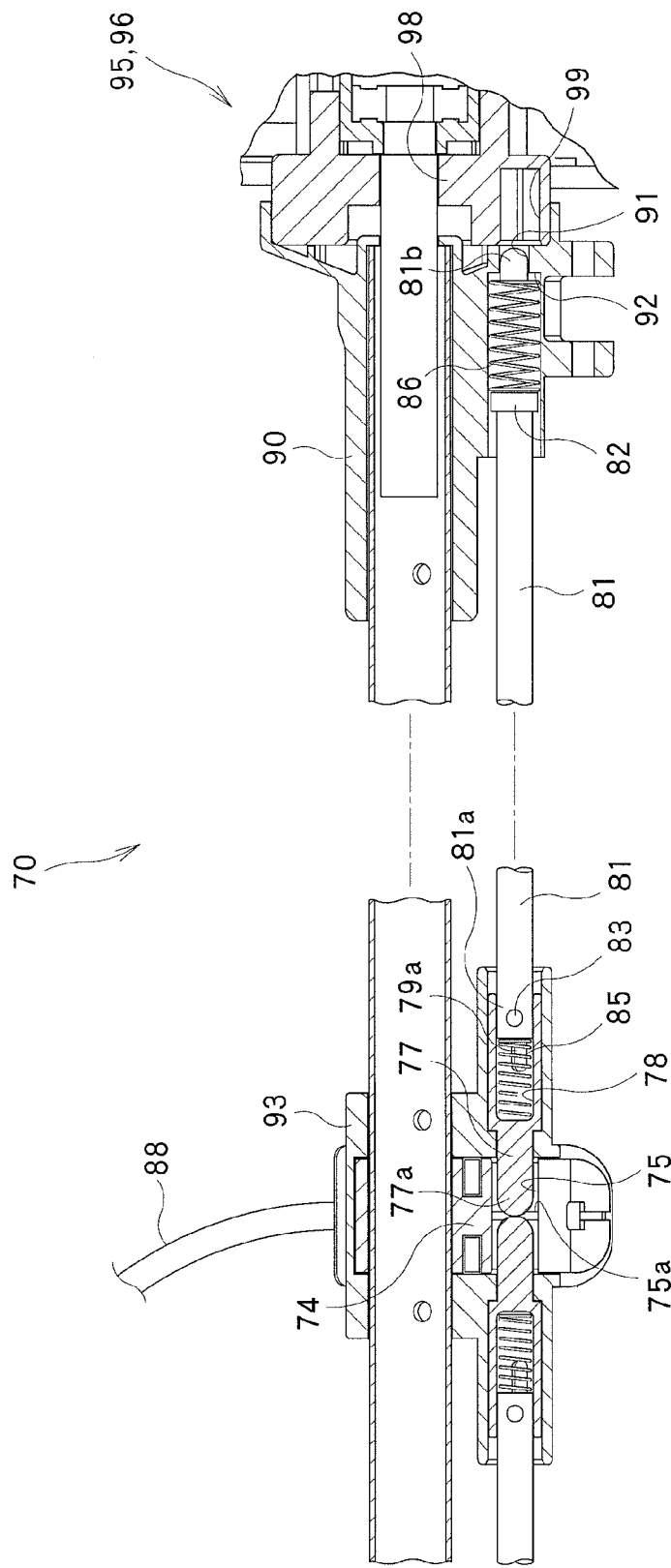
FIG. 17 is a partially enlarged view of FIG. 14.
Figure 18:
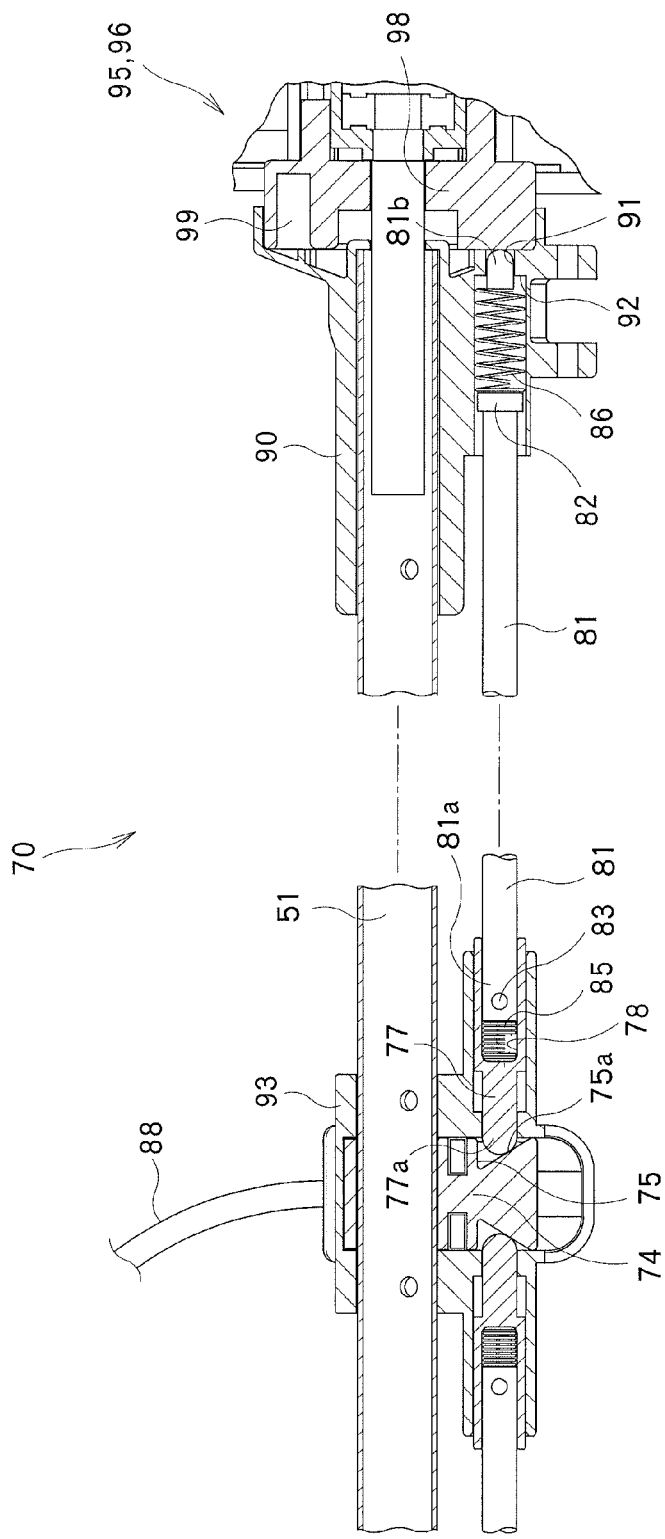
FIG. 18 is a view corresponding to FIG. 17, showing the braking mechanism in a condition different from the condition shown in FIG. 17.
Figure 19:
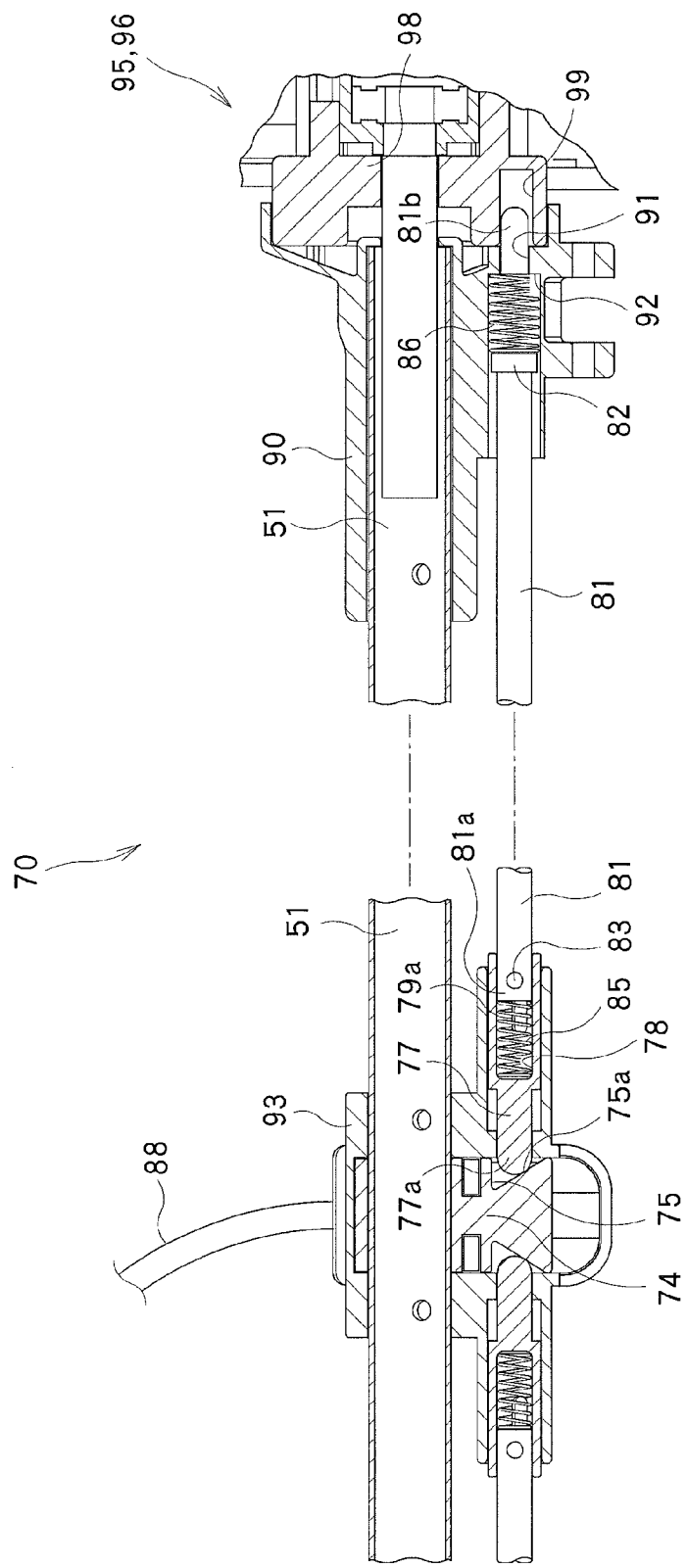
FIG. 19 is a view corresponding to FIG. 17, showing the braking mechanism in a condition different from the conditions shown in FIGS. 17 and 18.

Along with the movement of the cam member 74 between the first position and the second position, the socket member 77 is moved in the width direction. In the illustrated example, when the cam member 74 is located on the first position of FIG. 15, the socket member 77 is located relatively inside in the width direction, as shown in FIG. 17. On the other hand, when the cam member 74 is located on the second position of FIG. 16, the socket member 77 is located relatively outside in the width direction, as shown in FIGS. 18 and 19.

The shaft member 81 can be relatively moved in the width direction with respect to the socket member 77. In the illustrated example, in order to restrict a range where the shaft member 81 can be relatively moved with respect to the socket member 77, a pin 83 is disposed on the shaft member 81, and a side opening 79 is formed in a sidewall of the outer recess 78 of the socket member 77. The side opening 79 extends in the width direction and is configured to be engaged with the pin 83. Due to the engagement between the side opening 79 and the pin 83, the relative movement of the shaft member 81 with respect to the socket member 77 is guided, and the range where the shaft member 81 can be relatively moved is defined.

As shown in FIGS. 13 to 16, the braking mechanism 70 further includes an operation member 71 that operates the movement of the cam member 74 from the first position to the second position. As shown in FIGS. 13 to 16, a transmission means 88 formed of, e.g., a wire is provided between the operation member 71 and the cam member 74. A motion of the operation member 71 is transmitted to the cam member 74 through the transmission means 88. The operation member 71 is supported on the rear connection member 52 that is located on a position between the pair of rear legs 37 or a position between the pair of rear-wheel holding mechanisms 27. The operation member 71 can be moved between a release position and a restriction position. When the operation member 71 is moved from the release position to the restriction position, the cam member 74 is moved from the first position to the second position. On the other hand, when the operation member 71 is moved from the restriction position to the release position, the cam member 74 is moved from the second position to the first position. In this example, when the operation member 71 is moved from the release position to the restriction position, the operation member 71 is held as it is on the restriction position. The braking mechanism 70 further includes a release member that releases the operation member 71 held on the restriction position. The release member 72 is supported on the rear connection member 52 that is located on a position between the pair of rear legs 37 or a position between the pair of rear-wheel holding mechanisms 27, and is positioned in the vicinity of the operation member 71. In the illustrated example, both of the operation member 71 and the release member 72 are constructed as rotatable levers.

Next, the operation of the braking mechanism 70 as structured above is described. In a condition where the rotation of the middle wheel 96 is not restricted, the operation member 71 is located on the release position shown in FIG. 15, and the cam member 74 is located on the first position shown in FIG. 15. Simultaneously, the socket member 77 and the shaft member 81 are located on the positions shown in FIG. 17. Namely, the socket member 77 is located inside in the width direction. At this time, the first urging member 85, which is formed of, e.g., a compression spring, is stretched out and does not actively press the shaft member 81 outward in the width direction. On the other hand, the second urging member 86, which is formed of, e.g., a compression spring having an elastic coefficient lower than that of the first urging member 85 so as to be easily deformable, is somewhat compressed or stretched out, so that the outer end 81b of the shaft member 81 is held on a position where the outer end 81b does not project outward in the width direction from the outer opening 91 of the outer casing 90.

In order to restrict the rotation of the middle wheel 96, the operation member 71 is moved from the release position shown in FIG. 15 to the restriction position shown in FIG. 16, so that the cam member 74 is rotated from the first position to the second position. As shown in FIG. 18, along with the rotation of the cam member 74, the socket member 77 engaged with the cam surface 75a of the cam member 74 is moved outward in the width direction. At this time, along with the movement of the socket member 77, the first urging member 85 formed of a compression sprig having a higher elastic coefficient presses the shaft member 81 outward in the width direction. Note that, depending on a relationship between the position of the outer opening 91 of the outer casing 90 and the position of the locking recess 99 of the middle wheel 96, the shaft member 81 cannot be always moved outward in the width direction. In the condition shown in FIG. 18, the outer opening 91 of the outer casing 90 is closed by the wheel 98 of the middle wheel 96 from outside in the width direction, and the outer end 81b of the shaft member 81 does not project outward in the width direction from the outer casing 90. Thus, in the condition shown in FIG. 18, along with the outward movement of the socket member 77 in the width direction, the first urging member 85 is compressed in the outer recess 78 of the socket member 77 so as to press the shaft member 81 outward in the width direction.

When the middle wheel 96 is somewhat rotated from the condition of FIG. 18, the locking recess 99 of the middle wheel 96 is located on a position opposed to the outer opening 91 of the outer casing 90. At this time, as shown in FIG. 19, the shaft member 81 pressed by the first urging member 85 is moved outward in the width direction through the outer opening 91 of the outer casing 90 into the locking recess 99 of the middle wheel 96. When the shaft member 81 and the locking recess 99 have been engaged with each other, the rotation of the middle wheel 96 is restricted. In the condition shown in FIG. 19, both of the first urging member 85 and the second urging member 86 are somewhat compressed, and the force of the first urging member 85 which presses the shaft member 81 outward in the width direction and the force of the second urging member 86 which presses the shaft member 81 inward in the width direction remain in equilibrium.

In the manner as described above, the rotation of the pair of middle wheels 96 can be restricted. In order to release the restriction of rotation of the middle wheels 96, the release member 72 is operated to return the operation member 71 from the restriction position to the release position. When the operation member 71 is moved from the restriction position to the release position, the cam member 74 is moved from the second position to the first position, so that the socket member 77 and the shaft member 81 are moved inward in the width direction. As a result, the engagement between the shaft member 81 and the middle wheel 96 is released, whereby the middle wheel 96 becomes rotatable.

Although some modification examples of the above embodiment are described, it is naturally possible to suitably combine the plurality of modification examples.

What is claimed is:

1. A stroller comprising:
   a front leg;
   a middle leg located rearward of the front leg;
   a rear leg located rearward of the middle leg;
   a front-wheel holding mechanism provided on the front leg, the front-wheel holding mechanism being configured to rotatably and turnably hold a front wheel;
   a middle-wheel holding mechanism provided on the middle leg, the middle-wheel holding mechanism being configured to rotatably and unturnably hold a middle wheel; and
   a rear-wheel holding mechanism provided on the rear leg, the rear-wheel holding mechanism being configured to rotatably and turnably hold a rear wheel;
   a handle;
   a fourth link element pivotably joined, at a rear portion thereof, to the handle, and pivotably joined to an upper portion of the rear leg;
   a first link element pivotably joined, at a rear portion thereof, to the handle, and pivotably joined, at a front portion thereof, to the front leg;
   a second link element pivotably joined to a front portion of the fourth link element, and pivotably joined to an intermediate portion of the first link element;
   a third link element pivotably joined, at a rear portion thereof, to the second link element, and pivotably joined to an upper portion of the front leg and an upper portion of the middle leg;
   a fifth link element pivotably joined to the second link element and the middle leg, respectively; and
   a sixth link element pivotably joined to the handle and the rear leg, respectively,
   wherein the stroller is capable of letting babies ride thereon in such a manner that the babies are seated in a back to front direction.

2. The stroller according to claim 1, wherein:
   the middle leg includes a pair of the middle legs are provided to be spaced apart from each other in a the width direction;
   the middle-wheel holding mechanism is provided on each middle leg; and
   there is provided a braking mechanism capable of restricting rotation of the pair of middle wheels held on the middle-wheel mechanisms.

3. The stroller according to claim 2, further comprising a stand member attached to a lower portion of the handle, wherein the stroller in a folded condition can stand by itself with only the stand member and the rear wheel being grounded.

4. The stroller according to claim 3, wherein the stand member is swingably attached to the handle and is urged to be separated from the rear wheel.

5. The stroller according to claim 2, further comprising a first seat unit for letting a baby ride thereon and a second seat unit for letting a baby ride thereon,
   wherein
   the second seat unit is supported by a position, of the first link element, located rearward of the position at which the first link element is joined to the second link element, and
   the first seat unit is supported by the first link element on a position that is forward of the second seat unit.

6. The stroller according to claim 2, further comprising a first seat unit for letting a baby ride thereon and a second seat unit for letting a baby ride thereon,
   wherein
   the first seat unit is supported by the fourth link element, and
   The second seat unit is supported by the fourth link element.

7. The stroller according to claim 2, further comprising a first seat unit for letting baby ride thereon and a second seat unit for letting a baby ride thereon,
   wherein
   at least a portion of the first seat unit is located between the front leg and the middle leg, in the back to front direction of the stroller, and
   the second seat unit is located rearward of the first seat unit, and at least a portion of the second seat unit is located between the middle leg and the rear leg, in the back to front direction of the stroller.

8. The stroller according to claim 2, wherein:
   the braking mechanism includes: a cam member that is located on a position between the pair of middle-wheel holding mechanisms or a position between the pair of middle legs; and shaft members that are respectively disposed between the cam member and the one middle wheel and between the cam member and the other middle wheel;
   the cam member is movable between a first position and a second position;
   when the cam member is moved from the first position to the second position, each shaft member is moved outward in the width direction to be engaged with the corresponding middle wheel so as to restrict the rotation of the middle wheel; and
   when the cam member is moved from the second position to the first position, each shaft member is moved inward in the width direction to release the engagement between the shaft member and the corresponding middle wheel so as to enable the rotation of the middle wheel.

9. The stroller according to claim 8, wherein:
   the braking mechanism further includes: an operation member that is movable between a release position and a restriction position, when the operation member is moved from the release position to the restriction position, the operation member being held as it is on the restriction position; and a release member configured to release the operation member held on the restriction position;
   when the operation member is moved from the release position to the restriction position, the cam member is moved from the first position to the second position; and
   when the operation member is moved from the restriction position to the release position, the cam member is moved from the second position to the first position.

10. The stroller according to claim 8, wherein:
    the braking mechanism further includes an operation member configured to operate the movement of the cam member from the first position to the second position; and
    the operation member is supported on a rear connection member that is located on a position between the pair of rear legs or a position between the pair of rear-wheel holding mechanisms.

11. The stroller according to claim 8, wherein:
the braking mechanism further includes socket members respectively disposed between the cam member and the one shaft member and between the cam member and the other shaft member;
each socket member has a recess opening outward in the width direction; and
an inner end of the shaft member in the width direction is located in the recess of the socket member, and the shaft member is relatively moveable in the width direction with respect to the socket member.

12. The stroller according to claim 11, wherein
the braking mechanism further includes a first urging member configured to urge the shaft member outward in the width direction, and a second urging member configured to urge the shaft member inward in the width direction.

13. The stroller according to claim 1,
Wherein:
the front leg includes a pair of the front legs are provided to be spaced apart from each other in a width direction;
the middle leg includes a pair of the middle legs are provided to be spaced apart from each other in the width direction;
the rear leg includes a pair of the rear legs are provided to be spaced apart from each other in the width direction;
the front-wheel holding mechanism is provided on each front leg;
the middle-wheel holding mechanism is provided on each middle leg; and
the rear-wheel holding mechanism is provided on each rear leg.

14. A stroller comprising:
a front leg;
a middle leg located rearward of the front leg;
a rear leg located rearward of the middle leg;
a first link element pivotably joined, at a front portion thereof, to the front leg;
a handle pivotably joined to a rear portion of the first link element;
a fourth link element pivotably joined, at a rear portion thereof, to the handle, and pivotably joined to an upper portion of the rear front leg;
a second link element pivotably joined to a front portion of the fourth link element, and pivotably joined to an intermediate portion of the first link element;
a third link element pivotably joined, at a rear portion thereof, to the second link element, and pivotably joined to an upper portion of the front leg and an upper portion of the middle leg;
a fifth link element pivotably joined to the second link element and the middle leg, respectively; and
a sixth link element pivotably joined to the handle and the rear leg, respectively;
a front-wheel holding mechanism provided on the front leg, the front-wheel holding mechanism being configured to rotatably hold a front wheel;
a middle-wheel holding mechanism provided on the middle leg, the middle-wheel holding mechanism being configured to rotatably hold a middle wheel; and
a rear-wheel holding mechanism provided on the rear leg, the rear-wheel holding mechanism being configured to rotatably hold a rear wheel.

* * * * *